United States Patent
Buntin et al.

(10) Patent No.: US 7,133,511 B2
(45) Date of Patent: *Nov. 7, 2006

(54) TELEPHONY SECURITY SYSTEM

(75) Inventors: David L. Buntin, New Braunfels, TX (US); Keith S. Pickens, San Antonio, TX (US)

(73) Assignee: Securelogix Corporation, San Antonio, TX (US)

( * ) Notice: Subject to any disclaimer, the term of this patent is extended or adjusted under 35 U.S.C. 154(b) by 124 days.

This patent is subject to a terminal disclaimer.

(21) Appl. No.: 10/779,452

(22) Filed: Feb. 13, 2004

(65) Prior Publication Data

US 2004/0161086 A1 Aug. 19, 2004

Related U.S. Application Data

(63) Continuation-in-part of application No. 09/907,089, filed on Jul. 17, 2001, now Pat. No. 6,760,420, which is a continuation of application No. 09/593,888, filed on Jun. 14, 2000, now Pat. No. 6,320,948, which is a continuation of application No. 09/210,347, filed on Dec. 11, 1998, now Pat. No. 6,249,575, application No. 10/779,452, which is a continuation-in-part of application No. 10/649,204, filed on Aug. 27, 2003, now Pat. No. 6,879,671, and a continuation-in-part of application No. 10/625,311, filed on Jul. 23, 2003, now abandoned, and a continuation-in-part of application No. 10/200,969, filed on Jul. 23, 2002, now Pat. No. 6,700,964, and a continuation-in-part of application No. 09/709,592, filed on Nov. 10, 2000, now Pat. No. 6,735,291.

(60) Provisional application No. 60/448,232, filed on Feb. 16, 2003.

(51) Int. Cl.
*H04M 3/00* (2006.01)
*H04M 1/66* (2006.01)
(52) U.S. Cl. .................... 379/189; 379/199; 379/200
(58) Field of Classification Search ............ 379/112.39, 379/188, 189, 198, 199, 200, 219, 221.15
See application file for complete search history.

(56) References Cited

U.S. PATENT DOCUMENTS 4,332,982 A 6/1982 Thomas (Continued)

FOREIGN PATENT DOCUMENTS

CA 2094412 6/1994

(Continued)

OTHER PUBLICATIONS

"Penetration Analysis Test", Technologic, Inc. Services, http://www.tlogic.com/penetration.html.

(Continued)

*Primary Examiner*—Bing Q. Bui
(74) *Attorney, Agent, or Firm*—Jenkens & Gilchrist, P.C.

(57) ABSTRACT

A system and method of telephony resource management and security for monitoring and/or controlling incoming and outgoing calls between an enterprise's end-user stations and a public circuit-switched network and/or a public packet-switched network. A security policy is made up of one or more rules designating at least one action to be performed based on at least one attribute of the incoming or outgoing call. Calls are detected and sensed on the line, trunk and/or cabling, and analyzed to determine attributes associated with each call. Actions are performed based upon the determined attributes, in accordance with the security policy rules.

52 Claims, 16 Drawing Sheets

U.S. PATENT DOCUMENTS

| | | | |
|---|---|---|---|
| 4,639,557 A | 1/1987 | Butler et al. | |
| 4,653,085 A | 3/1987 | Chan et al. | |
| 4,783,796 A | 11/1988 | Ladd | |
| 4,866,773 A | 9/1989 | Lubarsky | |
| 4,876,717 A | 10/1989 | Barron et al. | |
| 4,905,281 A | 2/1990 | Surjaatmadja et al. | |
| 4,965,459 A | 10/1990 | Murray | |
| 5,003,599 A | 3/1991 | Landry | |
| 5,018,190 A | 5/1991 | Walker et al. | |
| 5,084,891 A | 1/1992 | Ariyavisitakul et al. | |
| 5,161,191 A | 11/1992 | Gupta et al. | |
| 5,276,529 A | 1/1994 | Williams | |
| 5,276,687 A | 1/1994 | Miyamoto | |
| 5,276,731 A | 1/1994 | Arbel et al. | |
| 5,311,593 A | 5/1994 | Carmi | |
| 5,345,595 A | 9/1994 | Johnson et al. | |
| 5,351,287 A | 9/1994 | Bhattacharyya et al. | |
| 5,436,957 A | 7/1995 | McConnell | |
| 5,490,212 A * | 2/1996 | Lautenschlager | 379/225 |
| 5,495,521 A | 2/1996 | Rangachar | |
| 5,510,777 A | 4/1996 | Pilc et al. | |
| 5,535,265 A | 7/1996 | Suwandhaputra | |
| 5,557,742 A | 9/1996 | Smaha et al. | |
| 5,581,228 A | 12/1996 | Cadieux et al. | |
| 5,590,195 A | 12/1996 | Ryan | |
| 5,606,604 A | 2/1997 | Rosenblatt et al. | |
| 5,623,601 A | 4/1997 | Vu | |
| 5,627,886 A | 5/1997 | Bowman | |
| 5,684,957 A | 11/1997 | Kondo et al. | |
| 5,706,338 A | 1/1998 | Relyea et al. | |
| 5,745,555 A | 4/1998 | Mark | |
| 5,802,157 A | 9/1998 | Clarke et al. | |
| 5,805,686 A | 9/1998 | Moller et al. | |
| 5,805,803 A | 9/1998 | Birrell et al. | |
| 5,812,763 A | 9/1998 | Teng | |
| 5,826,014 A | 10/1998 | Coley et al. | |
| 5,838,682 A | 11/1998 | Dekelbaum et al. | |
| 5,854,889 A | 12/1998 | Liese et al. | |
| 5,864,613 A | 1/1999 | Flood | |
| 5,864,666 A | 1/1999 | Shrader | |
| 5,892,903 A | 4/1999 | Klaus | |
| 5,898,830 A | 4/1999 | Wesinger, Jr. et al. | |
| 5,907,602 A | 5/1999 | Peel et al. | |
| 5,918,019 A | 6/1999 | Valencia | |
| 5,923,849 A | 7/1999 | Venkatraman | |
| 5,926,533 A | 7/1999 | Gainsboro | |
| 5,931,946 A | 8/1999 | Terada et al. | |
| 5,944,823 A | 8/1999 | Jade et al. | |
| 5,946,386 A * | 8/1999 | Rogers et al. | 379/265.09 |
| 5,949,864 A | 9/1999 | Cox | |
| 5,950,195 A | 9/1999 | Stockwell et al. | |
| 5,960,177 A | 9/1999 | Tanno | |
| 5,970,095 A | 10/1999 | Hauris et al. | |
| 6,021,324 A | 2/2000 | Sizer, II et al. | |
| 6,061,798 A | 5/2000 | Coley et al. | |
| 6,098,172 A * | 8/2000 | Coss et al. | 713/201 |
| 6,134,310 A | 10/2000 | Swan et al. | |
| 6,154,775 A | 11/2000 | Coss et al. | |
| 6,226,372 B1 | 5/2001 | Beebe et al. | |
| 6,226,751 B1 * | 5/2001 | Arrow et al. | 713/201 |
| 6,320,948 B1 | 11/2001 | Heilmann et al. | |

FOREIGN PATENT DOCUMENTS

| | | |
|---|---|---|
| CA | 2221365 | 11/1998 |
| DE | 10048553 | 4/2002 |
| DE | 10048609 | 5/2002 |
| WO | WO-96/22000 | 7/1996 |
| WO | WO-98/17072 | 4/1998 |
| WO | WO-98/53635 | 11/1998 |

OTHER PUBLICATIONS

"External Penetration Tests", http://www.m-tech.ab.ca/security/penetration.

"SecMOD©: A Security Risk Assessment Model", http://www.m-tech.ab.ca/products/secmod/.

"Introducing PhoneSweep™", Sandstorm Enterprises, Inc., http://www.sandstrom.net/phonesweep.

"Penetration Test", http://www.bruck-inc.com/html/security/pentesting.htm.

Babylon Standard Maximum Security for All ISDN Communications, Biodata, 4 pages.

NEWTON, Harry; "The Official Dictionary of Telecommunications, Networking and the Internet", Feb. 2001, pp. 751-752, 759, & 718.

* cited by examiner

TELEPHONY SECURITY SYSTEM

REFERENCE TO RELATED APPLICATION

This application is a continuation-in-part of U.S. patent application Ser. No. 09/907,089 entitled TELEPHONY SECURITY SYSTEM filed Jul. 17, 2001, now U.S. Pat. No. 6,760,420 which is a continuation-in-part of U.S. Pat. No. 6,542,592B1 entitled TELEPHONY SECURITY SYSTEM filed Oct. 19, 2001, which is a continuation of U.S. application Ser. No. 09/593,888 now U.S. Pat. No. 6,320,948 B1 entitled TELEPHONY SECURITY SYSTEM filed Jun. 14, 2000, which is a continuation of U.S. application Ser. No. 09/210,347 now U.S. Pat. No. 6,249,575 B1 entitled TELEPHONY SECURITY SYSTEM filed Dec. 11, 1998, each assigned to the assignee of the present application. This application is also a continuation-in-part of U.S. patent application Ser. No. 09/709,592, filed Nov. 10, 2000, now U.S. Pat. No. 6,735,291 entitled "A System and Method for Encapsulation, Compression and Encryption of PCM Data", U.S. patent application Ser. No. 10/200,969, filed Jul. 23, 2002, now U.S. Pat. No. 6,700,964, entitled "Encapsulation, Compression and Encryption of PCM Data", U.S. patent Ser. No. 10/625,311, filed Jul. 23, 2003, now abandoned entitled "An Improved Virtual Private Switched Telecommunications Network", and U.S. patent application Ser. No. 10/649,204, filed Aug. 27, 2003, now U.S. Pat. No. 6,879,671 entitled "An Improved Virtual Private Switched Telecommunications Network", all assigned to the assignee of the present invention and incorporated herein by reference.

This application claims the benefit of Provisional U.S. Patent Application 60/448,232 filed Feb. 16, 2003.

TECHNICAL FIELD

The invention relates generally to telecommunications monitoring and/or control systems and particularly to a telephony resource and security management system for monitoring and/or controlling access between end-user stations and the public circuit-switched network and/or the public packet-switched network.

BACKGROUND

Currently, there are telecommunication firewalls that operate on traditional circuit-switched networks, implementing a centrally managed, policy-based, enterprise-wide security policy, performing designated actions (such as allowing or denying the call, recording the call, redirecting the call, and monitoring the call for keywords), based on the determined attributes of a circuit-switched call (such as call direction, call source, call destination, and call type). U.S. patent application Ser. No. 09/907,089 entitled TELEPHONY SECURITY SYSTEM describes a telecommunication firewalls that operates on traditional circuit-switched networks.

Unfortunately, there is no equivalent device for performing the same and similar tasks for VoIP (Voice over Internet Protocol) calls. Current IP firewalls are in place on the packet-switched network, but they deal with attributes of individual packets, not attributes of the real-time packet-switched call itself. This is indeed unfortunate because a majority of the same call attributes determined on a circuit-switched call can also be determined on a real-time packet-switched call.

Therefore, there is a need for a telephony security system and method that provides centrally managed, policy-based, enterprise-wide monitoring and/or control of incoming and outgoing real-time packet-switched calls between an enterprise's end-user station and the public packet-switched network, based on attributes of the call itself.

Additionally, there is a need for a telephony security system and method that provides consolidated, central, policy-based, enterprise-wide monitoring and/or control of calls on both a circuit-switched network and a packet-switched network

SUMMARY

The present invention, accordingly, provides a system and method for centrally managed, policy-based, enterprise-wide enforcement of a security policy that designates monitoring and/or control functions to be performed on incoming and outgoing calls between an enterprise's end-user stations and two disparate networks—the public circuit-switched network and/or the public packet-switched network. In the most basic configuration, one or more rules are configured which designate at least one action to be performed based on at least one determined attribute of the inbound or outbound call.

The system determines specific attributes associated with inbound and outbound calls on circuit-switched and/or packet-switched networks. The system further determines, according to the rule whose criteria is matched by the determined attributes, whether certain inbound and outbound calls are allowed or denied, content-monitored for keywords, recorded, redirected, authorized for remote access, monitored for the presence of patterns of interest, conducted in encrypted mode. The rule-set may also designate that the system log the call event, adjust the security policy, sound a message or tone, generate real-time alerts, and generate reports. Alerts include, as examples: electronic mail notification, pager notification, console messaging, and/or a Simple Network Management Protocol (SNMP) trap notification.

Call attributes determined by the system include, as examples: call direction, call source, call destination, call-type (i.e., voice, fax, modem, STU-III-voice, STU-III-data, STU-III unspecified, Wideband data, Wideband video, IP telephone, busy, unanswered, and undetermined), call content such as keywords detected via speech recognition, or demodulated and decoded modem and/or fax data, call time, call date, call duration, the codec used, the number of bytes from the call source, the number of bytes from the call destination, the number of packets from the call source, the number of packets from the call destination, source and destination transmission rates; latency, jitter, packet loss, and total bandwidth used.

For all locations within the enterprise having telephony resources that are routed through a specialized in-line device (line sensor), the system monitors and/or controls access to telephone stations, fax machines, modems, STU-III devices, and video teleconference (VTC) stations on the enterprise private circuit-switched network, as well as access to IP telephones, and other elements on the enterprises private packet-switched network, including media gateways, call servers, IP firewalls, etc.

The present invention combines call-progress monitoring, caller-id (CND) and/or automatic number identification (ANI) decoding, digital line protocol reception, decoding, demodulation, pulse dial detection, tone detection (DTMF and MF), and speech recognition with microprocessor control, access-control logic, and call-interrupt circuitry for inspecting and analyzing circuit-switched calls and implementing the access control functions designated in the security policy.

Additionally, the present invention combines protocol decoding, decryption, and encryption, protocol translation/conversion, media packet decoding, decryption, demodulation, tone detection, speech recognition, software virus/worm detection, network address translation, and media packet encryption with microprocessor control for inspecting and analyzing packet-switched calls and implementing the access control functions designated in the security policy.

As used herein, the following terms carry the connotations described below:

"Public circuit-switched network" is understood to refer to a network for provision of circuit-switched circuits to the public, wherein a physical circuit is temporarily established on demand and kept reserved for the user until the network receives a disconnect signal.

"Public packet-switched network" is understood to refer to a network for provision of packet-switched circuits to the public, wherein data is carried in the form of packets.

"Keyword" is understood to refer to a predefined sequence of digital data.

"STU-III-voice" call-type is understood to refer to the encrypted voice transmission from a Secure Telephone Unit-III (STU-III) encryption device used by some government agencies, the military and some NATO agencies to conduct classified conversations.

"STU-III-data" call-type is understood to refer to the encrypted data transmission from the STU-III encryption device when it is used as a modem to transmit data to another STU-III location.

"STU-III-unspecified" call-type is understood to refer to transmissions from the STU-III devices, but due to the early version of the device, a determination of STU-III-voice or STU-III-data can not be made.

"Wideband" call-type is understood to refer to any non-voice grade data transmission using multiple channels on an Integrated Services Digital Network/Primary Rate Interface (ISDN/PRI) trunk (except video which is referenced separately; i.e., the bearer channel information transfer capability attribute is "speech," "3.1 kHz audio," "restricted data," "unrestricted data," or "unrestricted data with tones/announcements").

"Wideband video" call-type is understood to refer to any video transmission using multiple channels on a ISDN/PRI trunk (i.e., the bearer channel information transfer capability attribute is "video").

"Unanswered" call-type is understood to refer to the call wherein the call source hangs up before the call destination answers.

"Undetermined" call-type is understood to refer to the call wherein the called or calling party hangs up after the call is answered but before the call-type is determined.

BRIEF DESCRIPTION OF THE DRAWING FIGURES

A better understanding of the system and method for monitoring and/or controlling incoming and outgoing circuit-switched and/or packet-switched calls between a public network and end-user stations located within an enterprise may be had by reference to the drawing figures wherein.

DESCRIPTION OF THE EMBODIMENTS

Figure 1A:
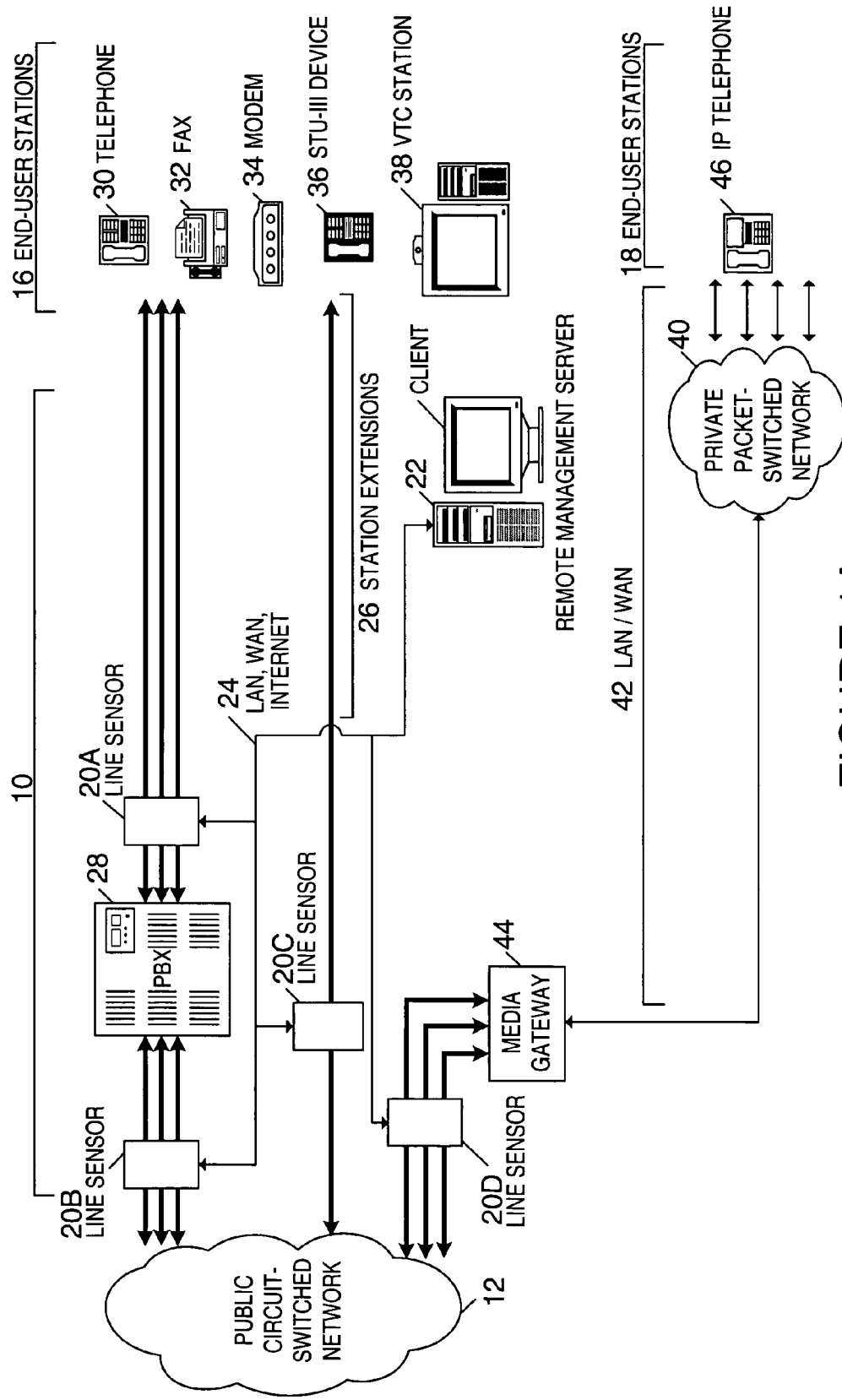
FIG. 1A is a schematic block diagram illustrating one embodiment of a telephony security system of the present invention wherein circuit-switched calls are routed through the system at a line sensor located on an enterprise private circuit-switched network.
Figure 1B:
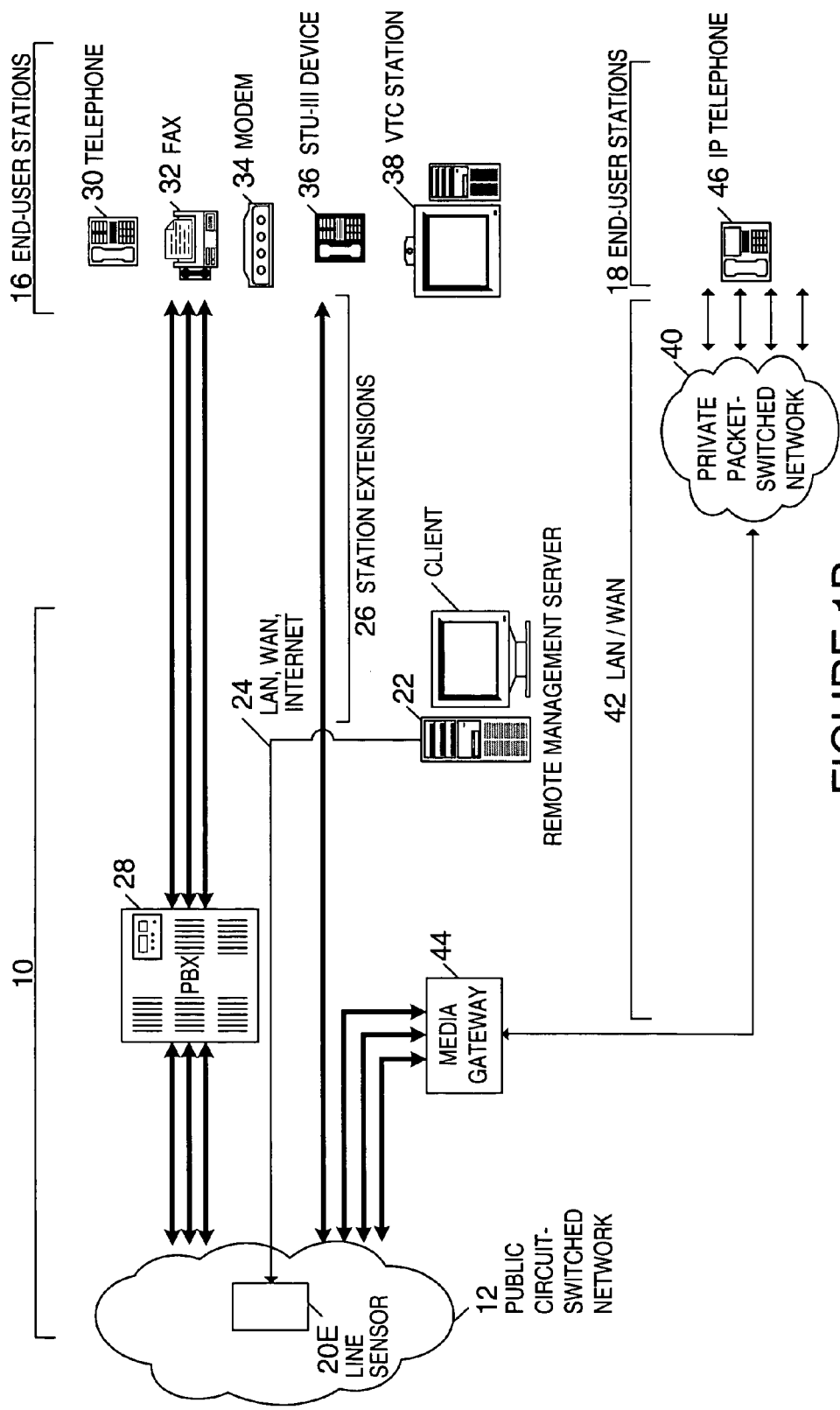
FIG. 1B is a schematic block diagram illustrating an alternate embodiment of the system of FIG. 1A wherein circuit-switched calls to/from an enterprise are routed through the system at a line sensor located on a public circuit-switched network.
Figure 1C:
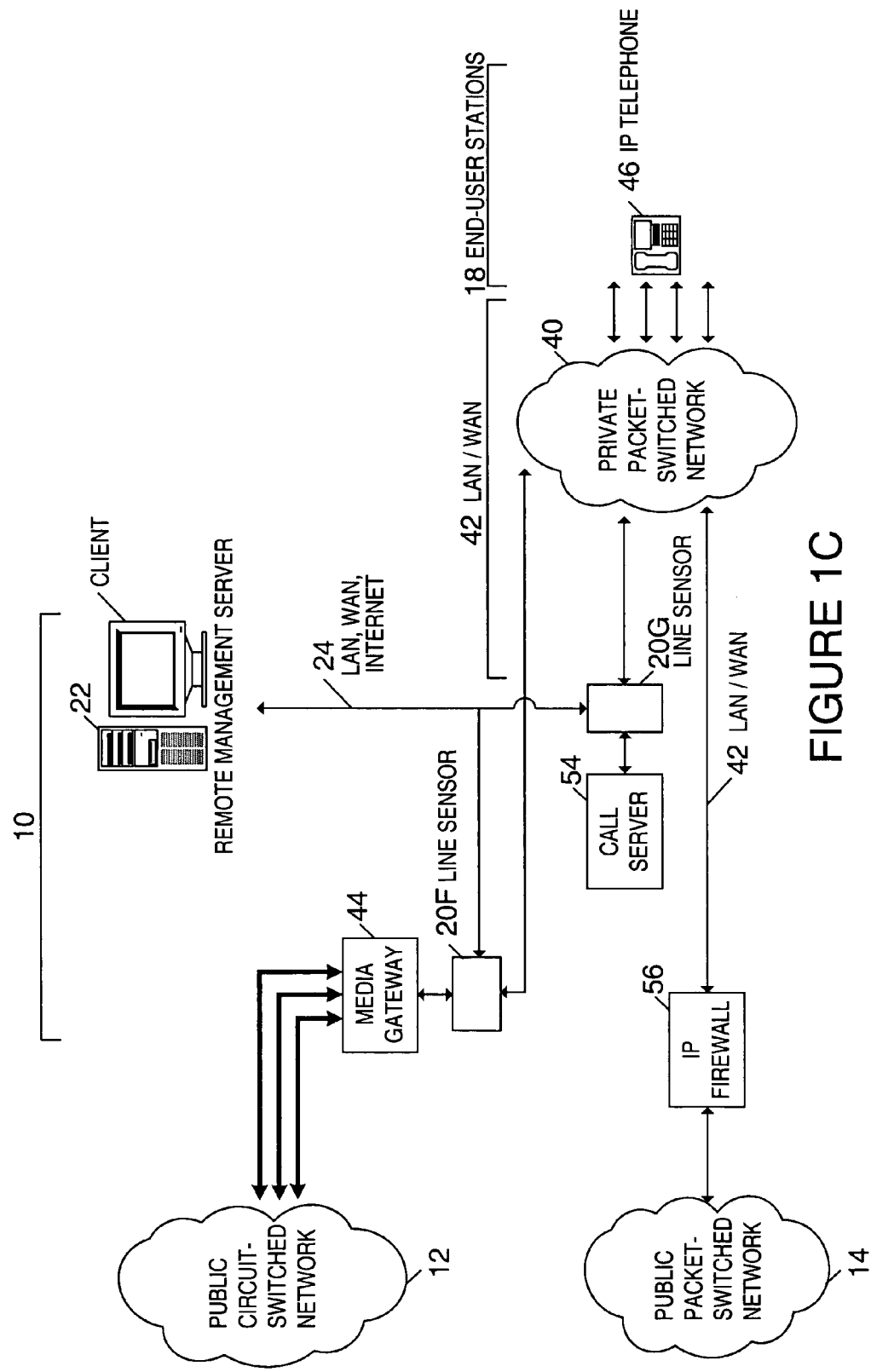
FIG. 1C is a schematic block diagram illustrating an alternate embodiment of the system of FIG. 1A wherein real-time packet-switched calls are routed through the system at a line sensor located on the packet-switched network-side of a media gateway.
Figure 1D:
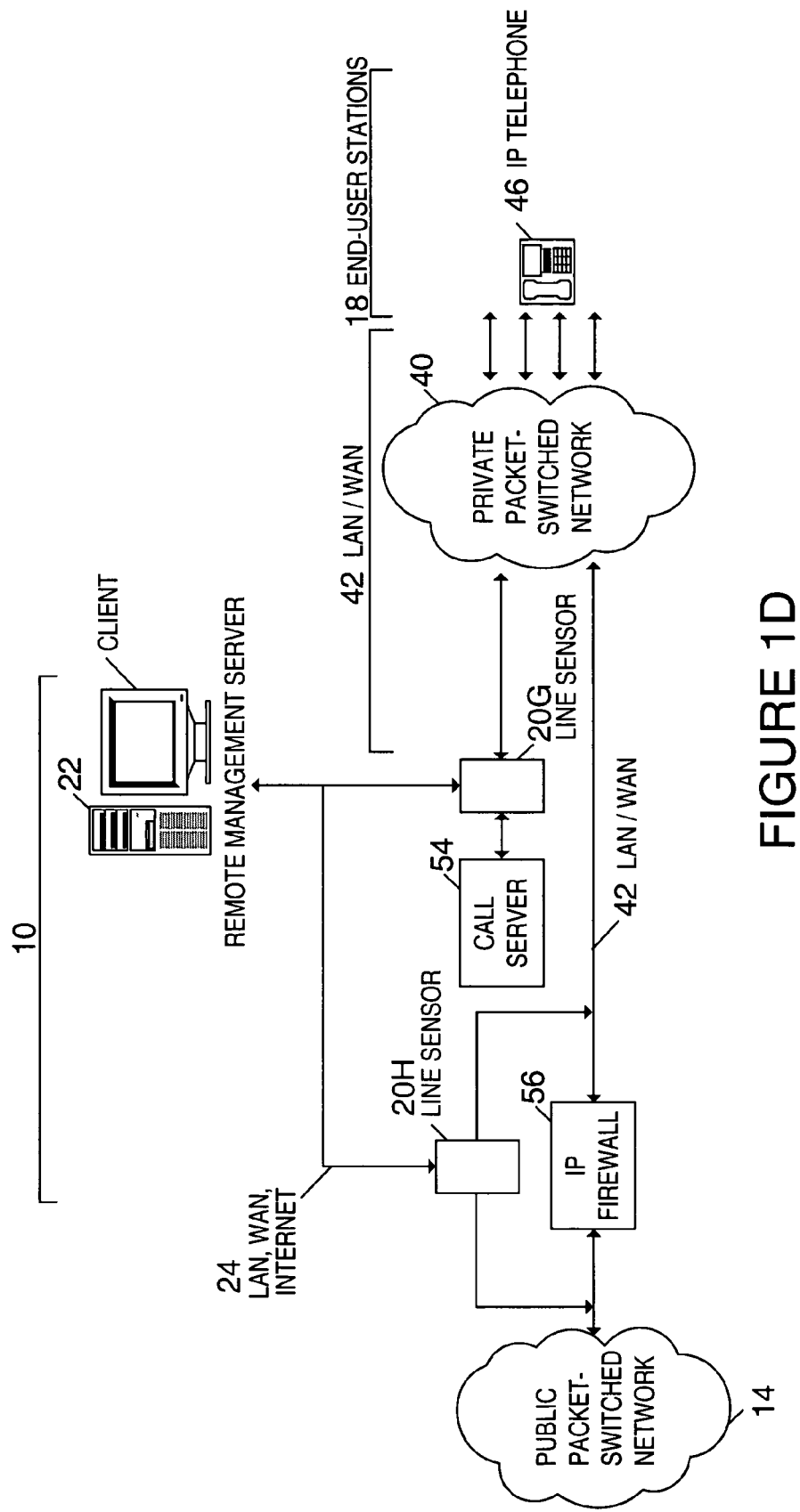
FIG. 1D is a schematic block diagram illustrating an alternate embodiment of the system of FIG. 1A wherein packet-switched calls are routed through the system at a line sensor connected parallel with an IP firewall.
Figure 1E:
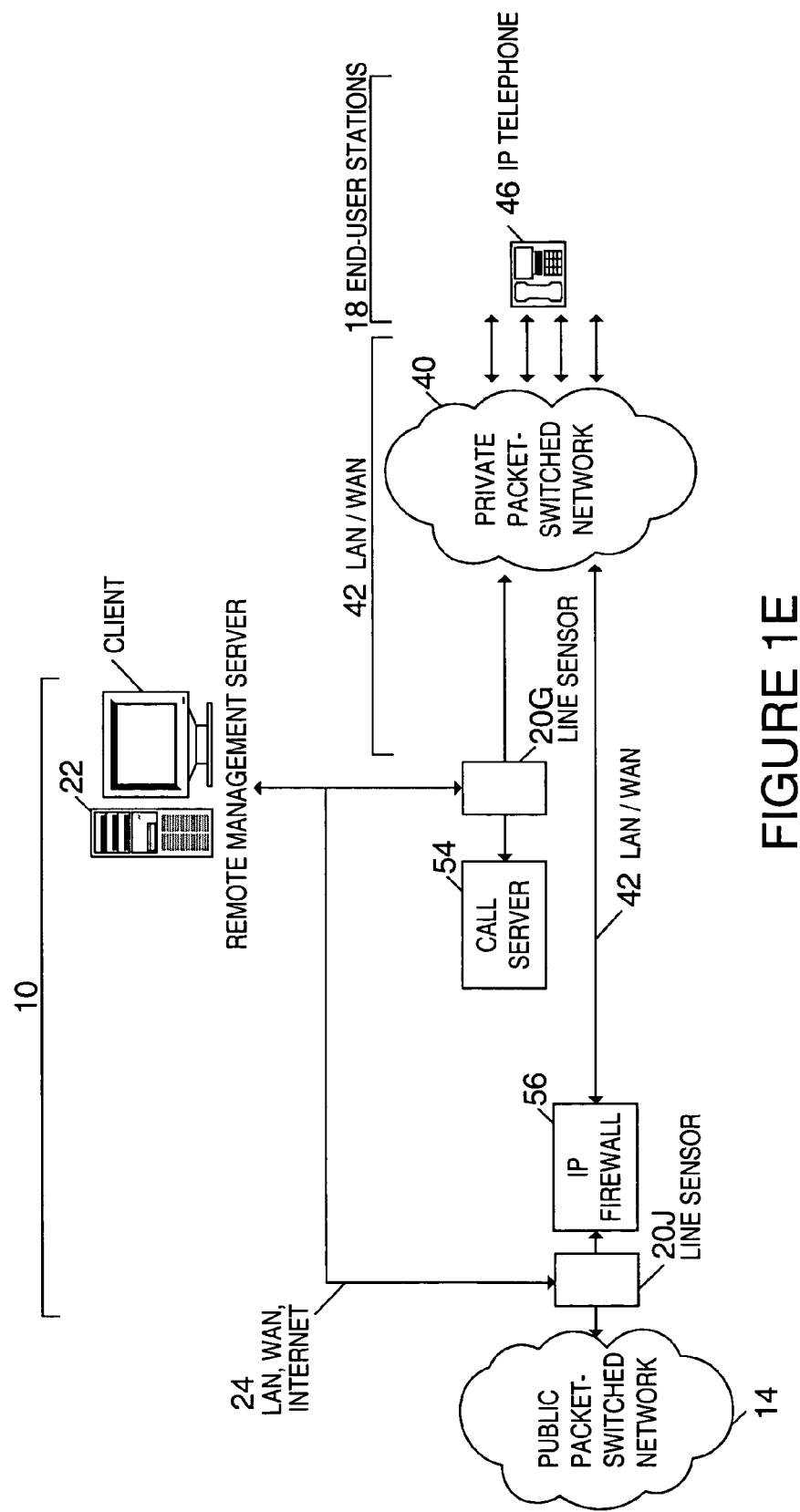
FIG. 1E is a schematic block diagram illustrating an alternate embodiment of the system of FIG. 1A wherein packet-switched calls are routed through the system at a line sensor located on the public packet-switched network-side of an IP firewall.
Figure 1F:
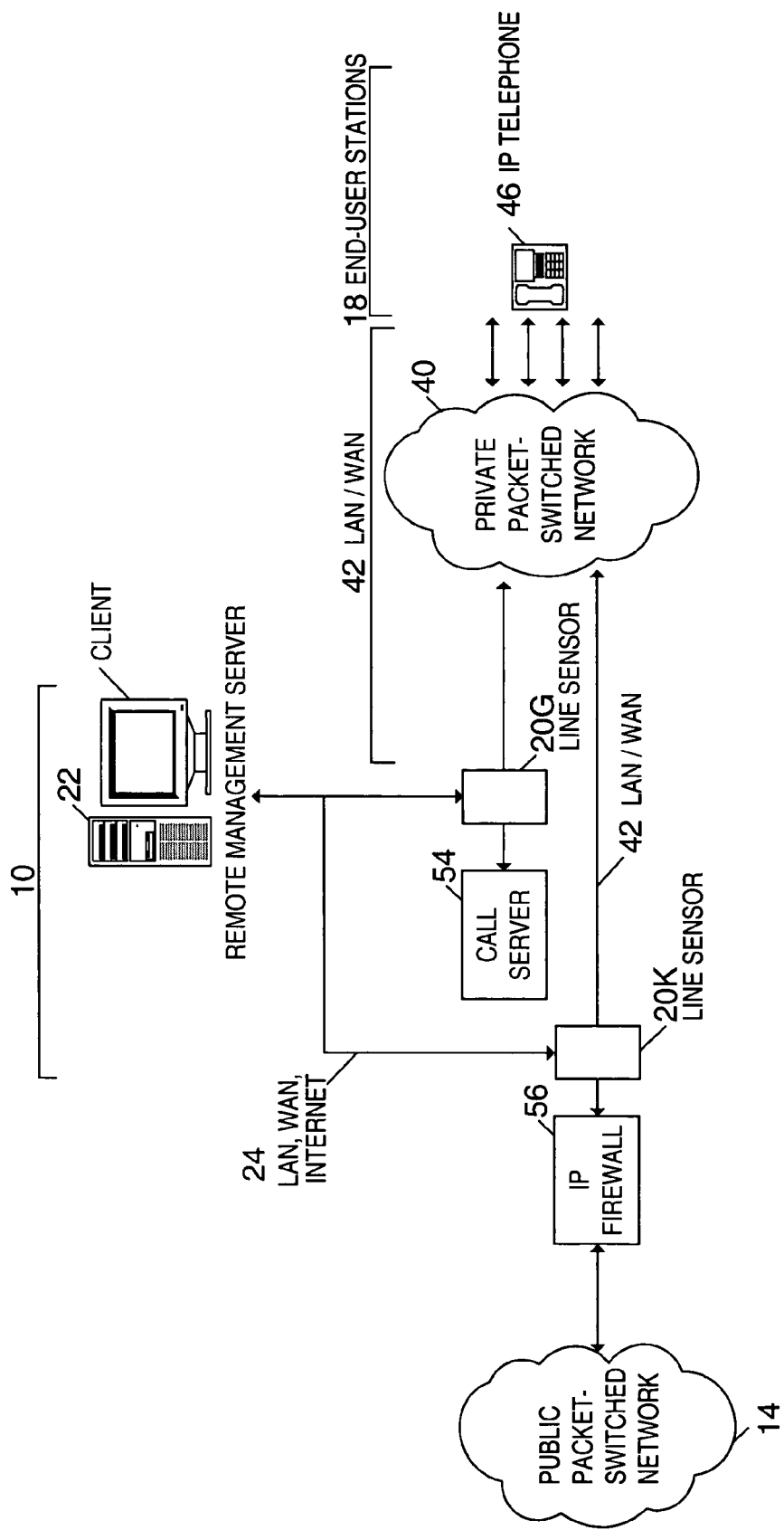
FIG. 1F is a schematic block diagram illustrating an alternate embodiment of the system of FIG. 1A wherein packet-switched calls are routed through the system at a line sensor located on the private packet-switched network-side of an IP firewall.
Figure 1G:
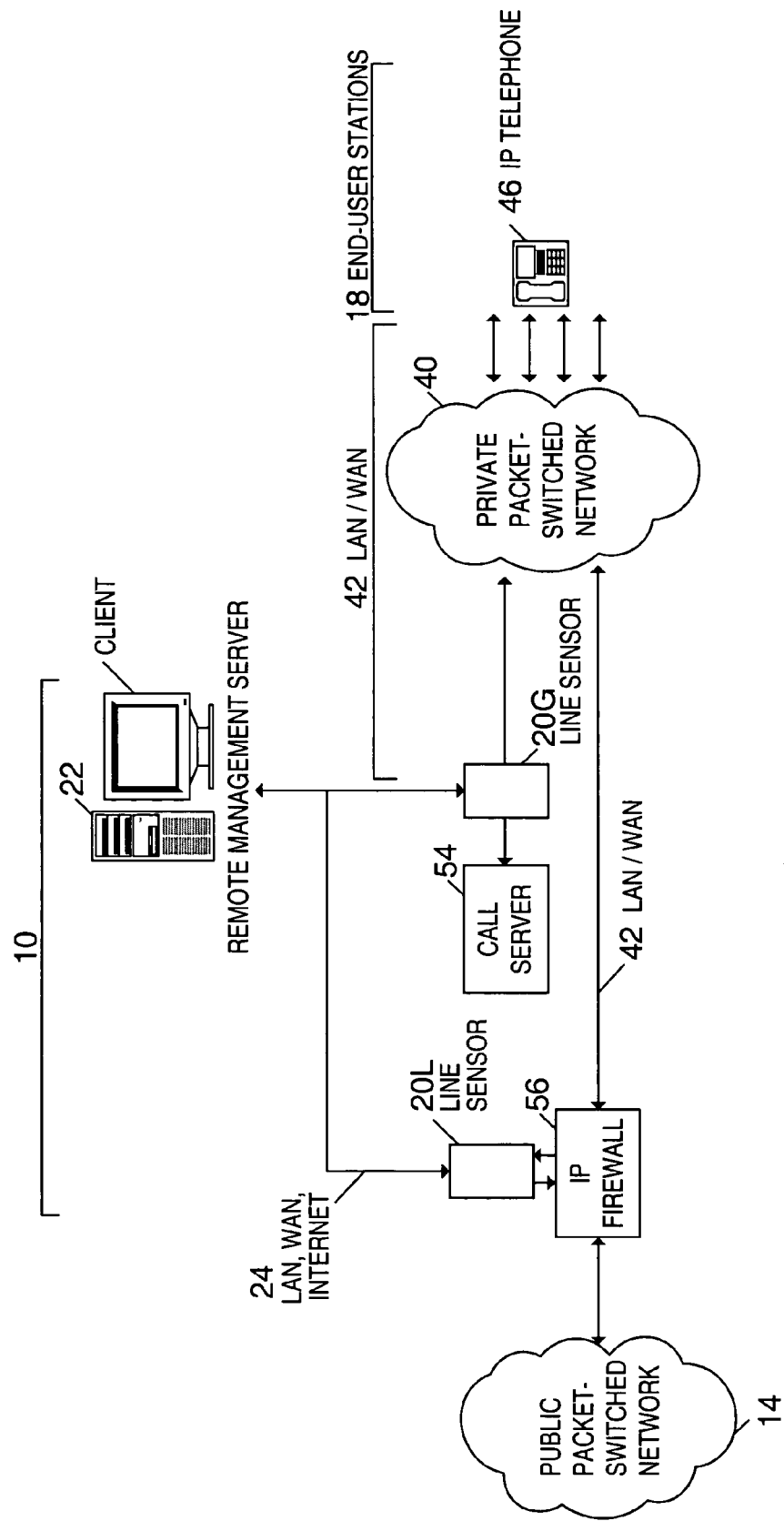
FIG. 1G is a schematic block diagram illustrating an alternate embodiment of the system of FIG. 1A wherein packet-switched calls are routed through the system at a line sensor which is interconnected with an IP firewall.
Figure 1H:
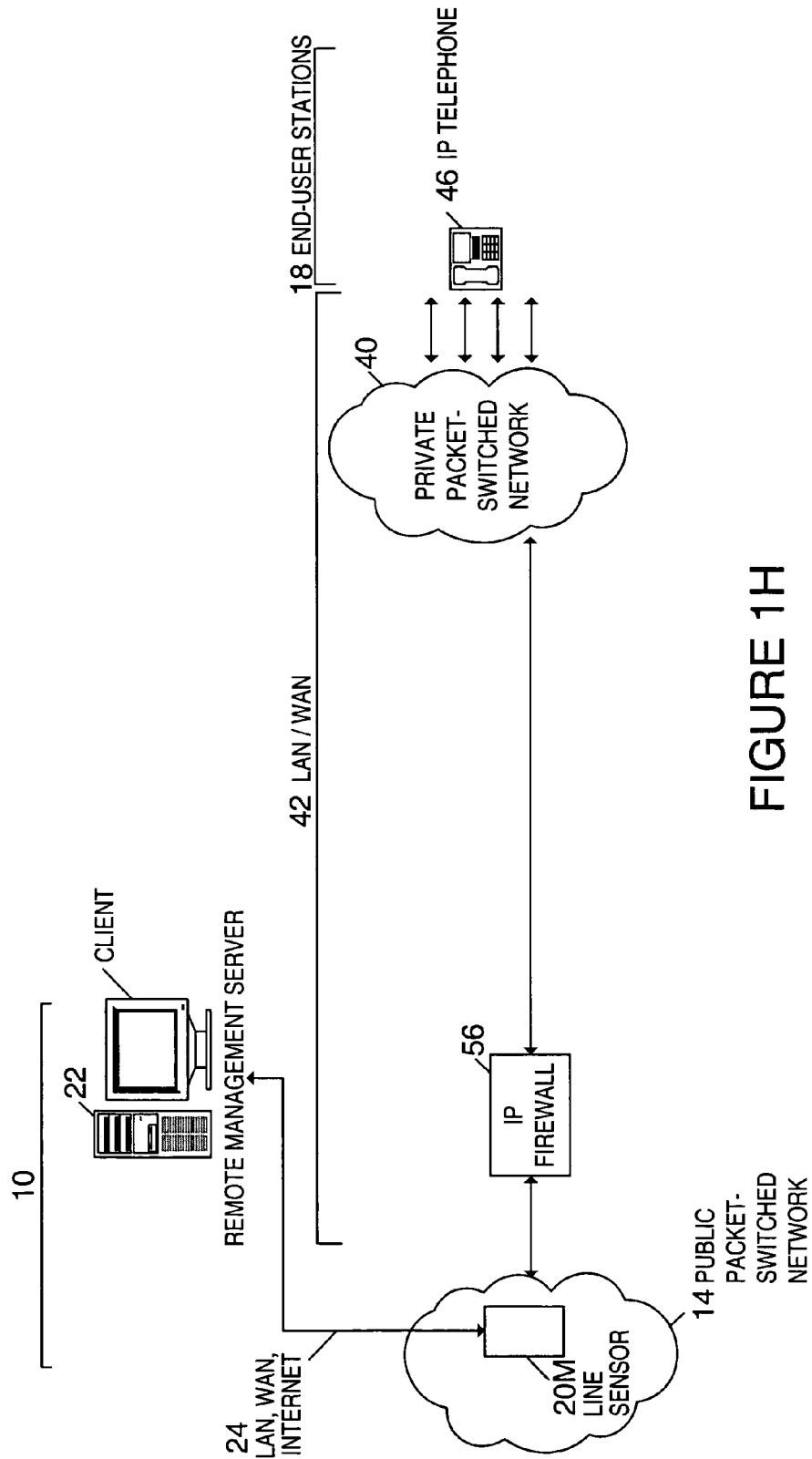
FIG. 1H is a schematic block diagram illustrating an alternate embodiment of the system of FIG. 1A wherein packet-switched calls to/from an enterprise are routed through the system at a line sensor located on a public packet-switched network.
Figure 1J:
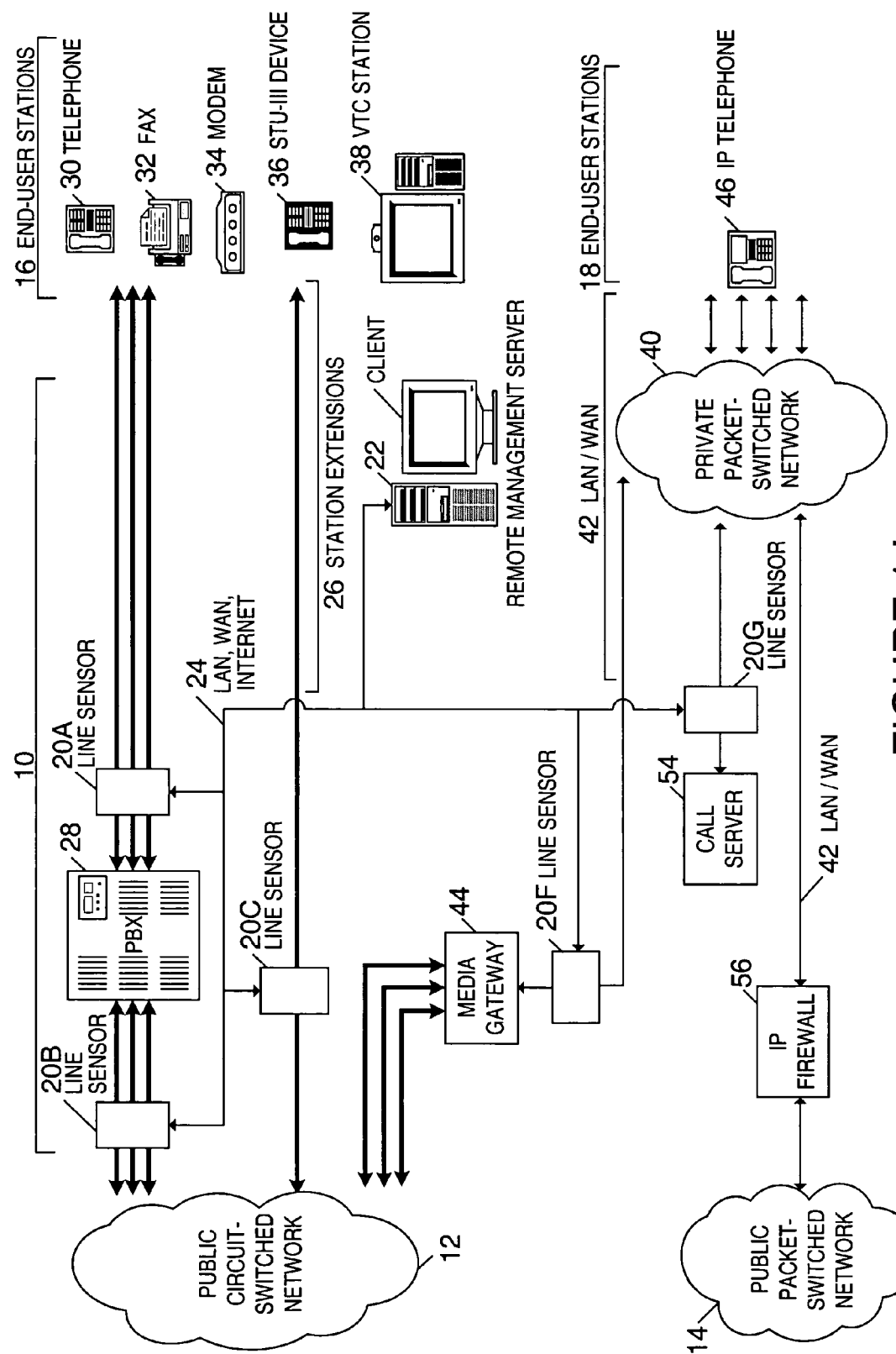
FIG. 1J is a schematic block diagram illustrating an alternate embodiment of the system of FIG. 1A wherein both circuit-switched and real-time packet-switched calls are routed through the system at line sensors located on the private circuit-switched network and on the packet-switched network-side of a media gateway.
Figure 1K:
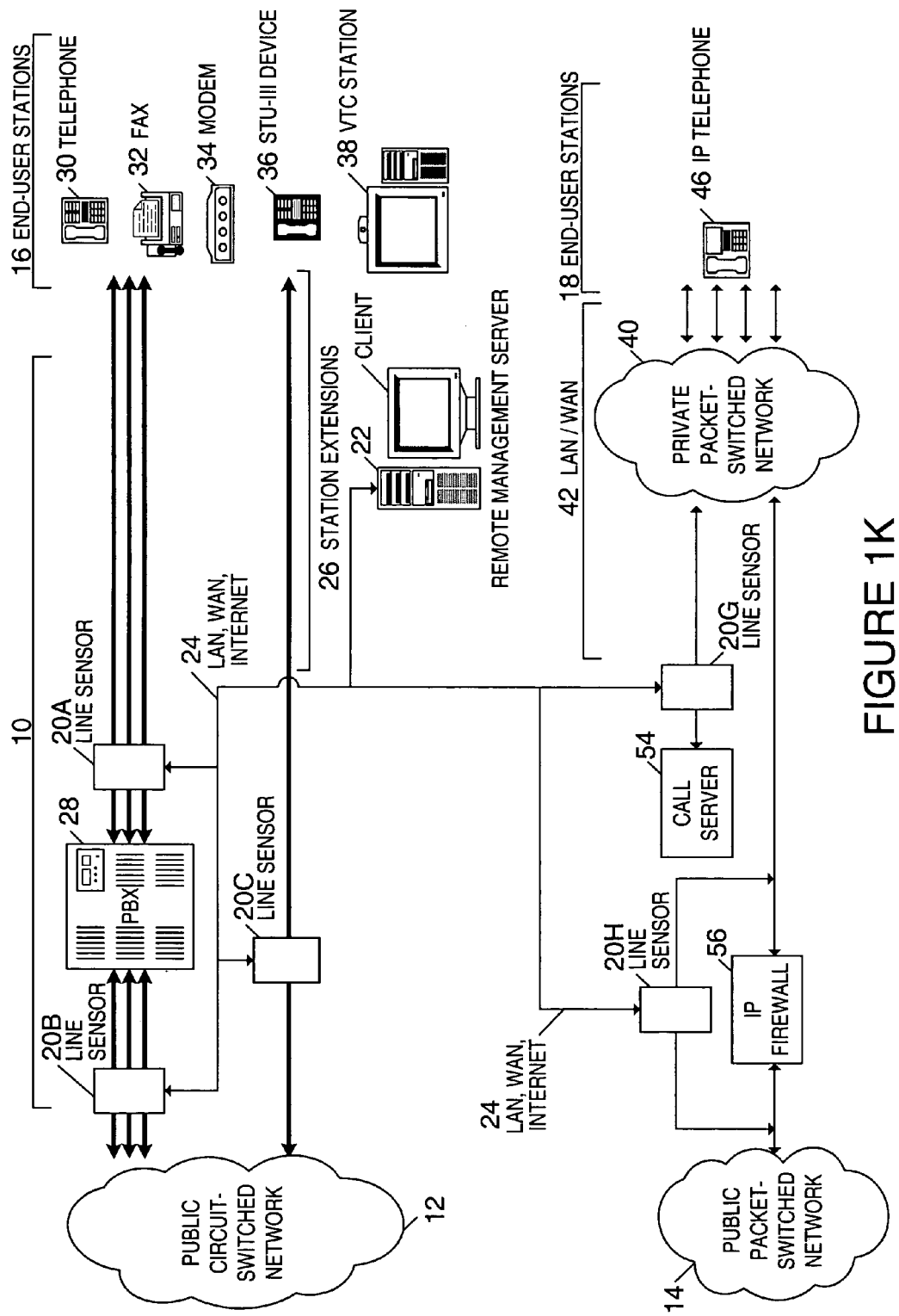
FIG. 1K is a schematic block diagram illustrating the preferred embodiment of the system of FIG. 1A wherein both circuit-switched and packet-switched calls are routed through the system at a line sensor located on the private circuit-switched network and on the private packet-switched network.
Figure 1L:
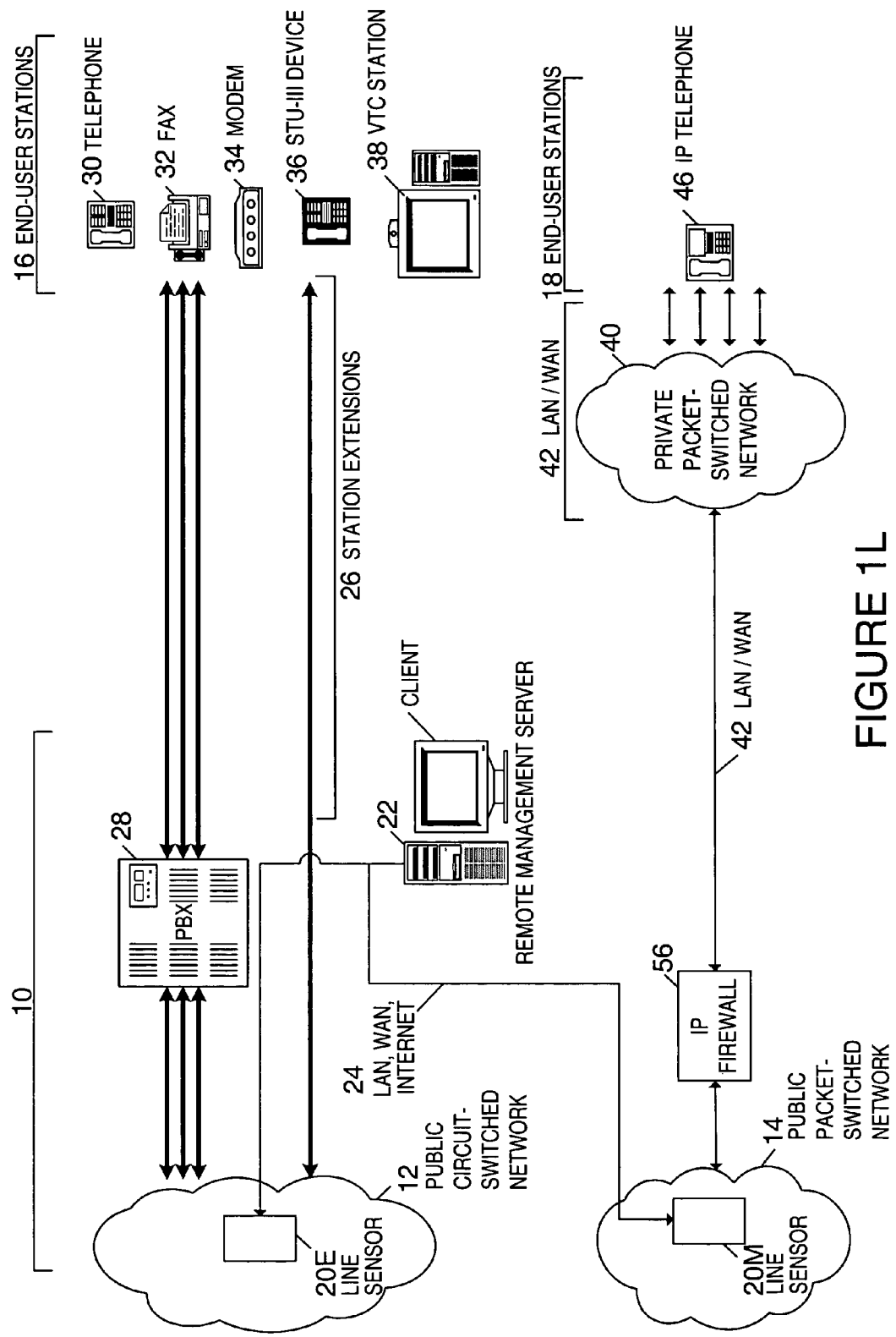
FIG. 1L is a schematic block diagram illustrating an alternate embodiment of the system of FIG. 1A wherein both circuit-switched and packet-switched calls to/from an enterprise are routed through the system at a line sensor located on the public circuit-switched network and on the public packet-switched network.
Figure 2:
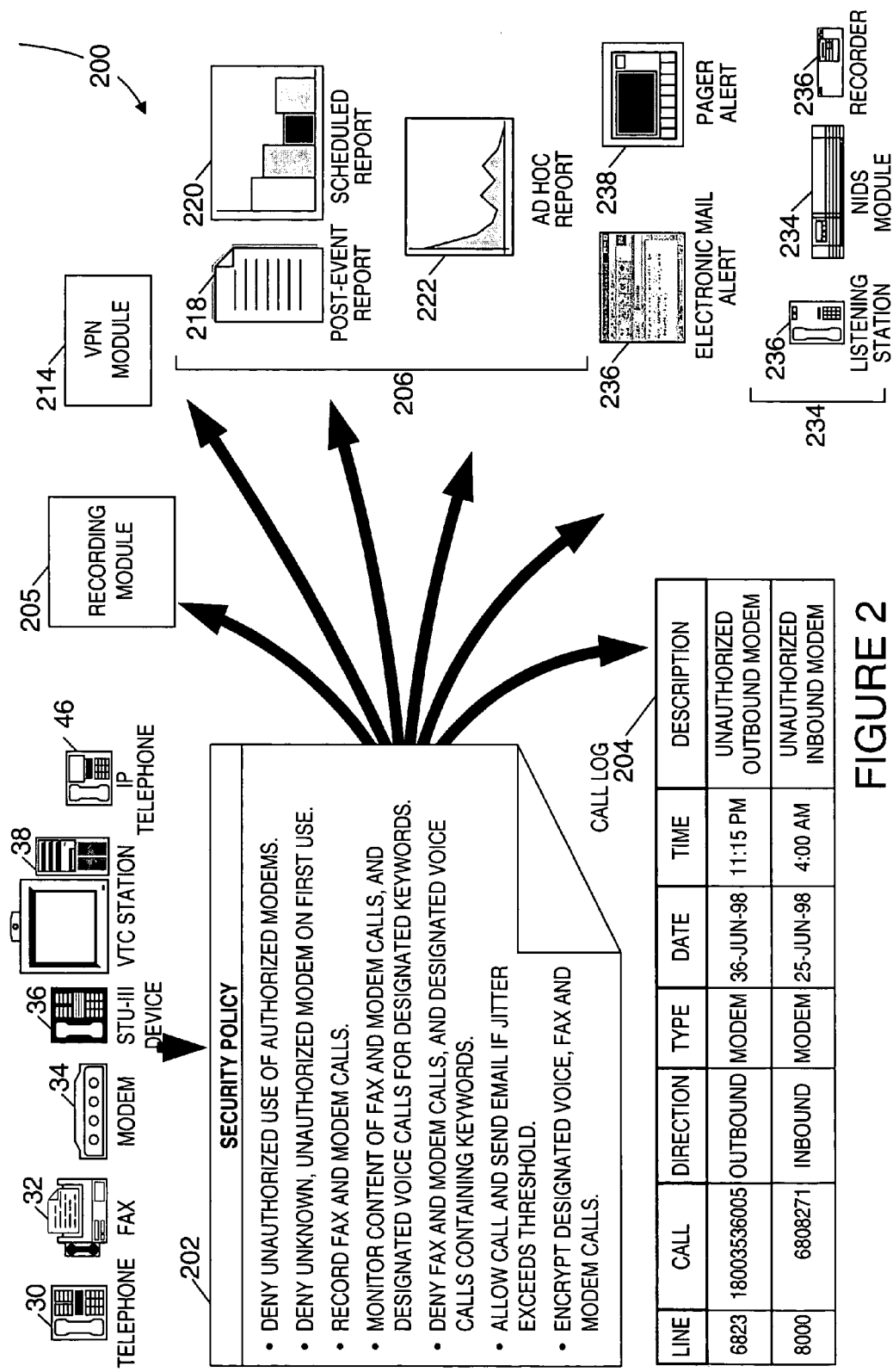
FIG. 2 is a functional block diagram illustrating a simplified example security policy and corresponding actions and features for use by the system of FIGS. 1A–1L.

FIGS. 1A–1L illustrate various configurations of a telephony security system 10 of the present invention, wherein incoming and outgoing calls between a public network and end-user stations within an enterprise are routed through the system 10 for monitoring and/or control of the calls pursuant to a security policy 202 (FIG. 2). The public network may be made up of: (1) a public circuit-switched network 12; (2) a public packet-switched network 14; or (3) both the public circuit-switched network 12 and the public packet-switched network 14. The end-user stations may be made up of: (1) one or more end-user stations 16 located on an enterprise private circuit-switched network; (2) one or more end-user stations 18 located on an enterprise private packet-switched network; or (3) both the end-user stations 16 and the end-user stations 18.

For each embodiment described herein, the system 10 consists primarily of: (1) at least one specialized device (i.e., line sensor, appliance, telephony appliance) 20 installed in-line on a circuit-switched and/or a packet-switched network; and (2) one or more network-accessible computers and processors and one or more clients (either local or remote to the computers and processors), herein referred to singly as a remote management server 22. The remote management server 22 is connected to the line sensor 20 by a LAN, WAN, or Internet 24). Calls to/from the public circuit-switched network 12 and/or the public packet-switched network 14 are routed through the system 10 at the line sensor 20. The line sensor 20 includes means for determining one or more attributes of circuit-switched and packet-switched calls. The system 10 includes means for performing one or more actions pursuant to the security policy 202, wherein actions may be performed by the line sensor 20 and the remote management server 22. The system 10 may be located within the enterprise, or some or all of the components of system 10 may be located outside the enterprise.

Although not shown, a single line sensor 20 may be connected on both the circuit-switched network and/or the packet-switched network. It is understood that the line sensor 20 is not required at all of the connections and locations discussed below with reference to FIGS. 1A–1L. Rather, the line sensor 20 may be located in accordance with the configuration of lines and cabling, and in accordance with the enterprise's desired level of security and resource management.

FIG. 1A illustrates one embodiment of the present invention wherein circuit-switched calls to/from the private circuit-switched network are routed through the system 10 at one or more line sensors 20 located on the private circuit-switched network, represented by a line sensor 20A, 20B, 20C and 20D. Station extensions 26 connect end-user stations 16 to either a Public Branch eXchange (PBX) 28 or a central office (not shown, located in the public circuit-switched network 12). The end-user stations 16 include as examples: a telephone 30; a fax machine 32; a modem 34; a STU-III device 36; and a Video TeleConference (VTC) station 38. The modem 34 may support, for example, desktop or portable personal computers, or systems requiring modems for remote dial-up monitoring or maintenance access, such as PBXs, routers, Heating, Ventilation and Air Conditioning (HVAC) systems, and alarm systems.

Connectivity of the line sensor 20 within the private circuit-switched network may be any combination of: (1) a PBX end-user station-side connection, represented by the line sensor 20A; (2) a PBX trunk-side connection, represented by the line sensor 20B; (3) a connection on a line directly connecting with a central office located within the public circuit-switched network 12, represented by the line sensor 20C; and (4) a media gateway circuit-switched network-side connection, represented by line sensor 20D.

The remote management server 22 provides the primary user interface whereupon the system administrator programs the security policy 202 and other operational features of the system 10. The system administrator downloads the security policy 202 and other appropriate programming to all or selected line sensor 20 from the remote management server 22. The remote management server 22 receives call log event records from the line sensor 20 and performs tracking functions pursuant to the security policy 202. The remote management server 22 provides audio play-back of recorded voice call content; viewing and printing of reconstructed data call content; and consolidation, management, display and printing of call logs 204 and reports 206 (FIG. 2). Archiving of call logs 204, reports 206, and recorded and reconstructed call content may also be accomplished on the remote management server 22, or on another network-accessible server. The line sensor 20 and management server 22 may communicate within the enterprise network with various host computers for providing the reporting functions.

The remote management server 22 allows the system administrator to monitor system operations and view ongoing call activity and call logs 204 (including changes in call attributes) flowing through the line sensor 20, regardless of whether the line sensor 20 is located nearby or at a very remote distance therefrom.

The system administrator may preempt or complement actions the line sensor 20 performs in enforcing the security policy 202, thereby manually allowing or denying a call, and/or causing the call to be redirected, recorded, content-monitored, authenticated for remote access, and/or conducted in encrypted mode. The system administrator may preempt or complement line sensor 20 actions from either the remote management server 22, client, or the specific line sensor 20 whose actions are to be preempted or complemented.

The remote management server 22 detects a loss of power to, operation of, or communication with the line sensor 20. Upon detection of such an event, the remote management server 22 logs the event, generates a report and/or alert to designated personnel, pursuant to the security policy 202. If the connection between the remote management server 22 and the line sensor 20 is lost, the line sensor 20 continues to enforce the security policy 202. Policies also remain in effect if the line sensor 20 reboots. Additionally, if a loss of service on the line or cabling is detected, the remote management server 22 performs administrator-designated logging, reporting, and alert notifications.

Referring again to the connection represented by line sensor 20D, a LAN or WAN (LAN/WAN) 42 connects end-user stations 18 to components on the private packet-switched network 40, including a media gateway 44. The end-user stations 18 include an example: an IP telephone 46. Routing all real-time packet-switched (VoIP) calls through the line sensor 20D, located on the circuit-switched network-side of the media gateway 44, allows the system 10 to monitor and/or control real-time packet-switched calls from end-user stations 18 on the private packet-switched network.

FIG. 1B illustrates an alternate embodiment of the present invention wherein circuit-switched calls to/from an enterprise are routed through the system 10 at one or more line sensors 20 located on the public circuit-switched network 12, represented by a line sensor 20E. This embodiment allows service providers to offer centralized monitoring and/or control of circuit-switched calls between the public circuit-switched network 12 and the customer private circuit-switched network, pursuant to the security policy 202 configured to meet the needs of the customer enterprise.

Connectivity of the system 10 within the public circuit-switched network 12 may be any combination of: (1) a connection on a line directly connecting end-user stations with the central office (CO) (similar to that represented by line sensor 20C), with the line sensor 20E connected outside the perimeter of the customer private circuit-switched network; (2) a CO trunk-side connection, between the CO and the perimeter of the customer private circuit-switched network; (3) a connection within the CO; and (4) a connection in the public circuit-switched network wherein the line sensor 20E is in an auxiliary position and the carrier purposefully routes traffic to and from the line sensor 20E; each represented by the line sensor 20E.

The remote management server 22 may be located: (1) outside the customer enterprise; (2) within the customer enterprise; or (3) outside the customer enterprise with one or more remote clients located within the customer enterprise to provide the customer's administrators with access to all or some of the operational features of the remote management server 22.

FIG. 1C illustrates an alternate embodiment of the present invention wherein real-time packet-switched calls are routed through the system 10 at one or more line sensors 20 located on the packet-switched network-side of the media gateway 44, represented by a line sensor 20F. The LAN/WAN 42 connects the end-user stations 18 to components on the private packet-switched network 40, including the media gateway 44, a call manager (call server) 54, and an IP firewall 56. All packet-switched traffic that is not real-time traffic (e.g., http, electronic mail, etc.), is routed through and processed by the IP firewall 56. All real-time packet-switched traffic is routed through the line sensor 20F, which processes the real-time packets pursuant to the security policy 202.

The line sensors 20 may also be located at points of converging and concentrated network signaling (e.g., at network elements such as the call server 54, proxy servers, IP PBXs, etc.), as represented by line sensor 20G, located between the call server 54 and the end-user stations 18.

FIG. 1D illustrates an alternate embodiment of the present invention wherein packet-switched calls are routed through the system 10 at one or more line sensors 20 parallel with the IP firewall 56, represented by a line sensor 20H. The traffic that is not real-time packet-switched traffic is routed through and processed by the IP firewall 56. Real-time packet-switched traffic is routed through the line sensor 20H, which processes the real-time packets pursuant to the security policy 202.

Alternatively, all packet-switched traffic may be routed through both the line sensor 20H and the IP firewall 56. In this embodiment, the line sensor 20H processes the real-time packets pursuant to the security policy 202 and discards packets that are not real-time packets. The IP firewall 56 processes packet-switched traffic that is not real-time traffic and discards the real-time packet-switched traffic.

FIG. 1E illustrates an alternate embodiment of the present invention wherein real-time packet-switched calls are routed through the system 10 at one or more line sensors 20 located on the public packet-switched network-side of the IP firewall 56, represented by a line sensor 20J. The IP firewall 56 processes all traffic that is not real-time packet-switched traffic and passes on, untouched, all real-time packet-switched traffic. The line sensor 20K processes all real-time packets pursuant to the security policy 202 and passes on, untouched, all traffic that is not real-time packet-switched traffic.

FIG. 1F illustrates an alternate embodiment of the present invention wherein real-time packet-switched calls are routed through the system 10 at one or more line sensors 20 located on the private packet-switched network-side of the IP firewall 56, represented by a line sensor 20K. The IP firewall 56 processes all traffic that is not real-time packet-switched traffic and passes on, untouched, all real-time packet-switched traffic. The line sensor 20K processes the real-time packets pursuant to the security policy 202 and passes on, untouched, all traffic that is not real-time packet-switched traffic.

FIG. 1G illustrates an alternate embodiment of the present invention wherein real-time packet-switched calls are routed through the system 10 at one or more line sensors 20 interconnected with the IP firewall 56, represented by a line sensor 20L. The IP firewall 56 processes all traffic that is not real-time packet-switched traffic and sends all real-time packet-switched traffic to the line sensor 20M for processing. The line sensor 20M processes the real-time packets pursuant to the security policy 202 and sends processed packets back to the IP firewall 56 for forwarding.

FIG. 1H illustrates an alternate embodiment of the present invention wherein packet-switched calls to/from an enterprise are routed through the system 10 at one or more line sensors 20 located on the public packet-switched network 14, represented by a line sensor 20M. This embodiment allows service providers to offer centralized monitoring and/or control of real-time packet-switched calls between the public packet-switched network 14 and components (e.g., end-user stations 18) on the customer private packet-switched network 40, pursuant to the security policy 202. The line sensor 20M processes the real-time packets pursuant to the security policy 202 and passes on, untouched, all traffic that is not real-time packet-switched traffic. Components on the customer private packet-switched network 40 (e.g., the IP firewall 56) process the packet-switched traffic that is not real-time traffic.

Connectivity of the system 10 within the public packet-switched network 14 may be any combination of: (1) a connection on a line directly connecting end-user stations with the service provider's central office facility, with the connection located outside the perimeter of the customer private packet-switched network; (2) a service provider's central office facility trunk-side connection, between the service provider's central office facility and the perimeter of the customer private packet-switched network; (3) a connection within the service provider's central office facility; and (4) a connection in the public packet-switched network wherein the line sensor 20M is in an auxiliary position and the carrier purposefully routes traffic to and from the line sensor 20M; each represented by the line sensor 20M.

The remote management server 22 may be located: (1) outside the customer enterprise; (2) within the customer enterprise; or (3) outside the customer enterprise with one or more remote clients located within the customer enterprise to provide the customer's administrators with access to all or some of the operational features of the remote management server 22.

FIG. 1J illustrates an alternate embodiment of the present invention wherein both circuit-switched and real-time packet-switched calls are routed through the system 10 at one or more line sensors 20 connected on the private circuit-switched network and on the packet-switched network-side of the media gateway 44. Circuit-switched calls are routed through the line sensor 20A, 20B, and 20C, as described with reference to FIG. 1A. Real-time packet-switched traffic is routed through the line sensor 20F, as described with reference to FIG. 1C. This embodiment provides centralized monitoring and/or control of both circuit-switched calls to/from the private circuit-switched network and real-time packet-switched calls to/from the private packet-switched network 40.

FIG. 1K illustrates the preferred embodiment of the present invention, wherein both circuit-switched and packet-switched calls are routed through the system at one or more line sensors 20 connected on both the private circuit-switched network and on the private packet-switched network 40 parallel with the IP firewall 56. This embodiment provides centralized monitoring and/or control of calls to/from both the private circuit-switched network and the private packet-switched network 40. Circuit-switched calls are routed through the line sensor 20A, 20B, and 20C, as described with reference to FIG. 1A. Packet-switched traffic is routed through the line sensor 20H, as described with reference to FIG. 1D. This embodiment provides centralized monitoring and/or control of calls to/from both the private circuit-switched network and the private packet-switched network 40.

Although not shown, alternate embodiments are contemplated wherein circuit-switched calls are routed through the system 10 at line sensor 20A, 20B, and 20C, as described with reference to FIG. 1A, and packet-switched traffic is routed through the system 10 at line sensor 20J, 20K, or 20L as described with reference to FIG. 1E, 1F, or 1G, respectively.

FIG. 1L illustrates an alternate embodiment of the present invention wherein circuit-switched calls are routed through the system 10 at line sensor 20E, as described with reference to FIG. 1B, and packet-switched calls are routed through the system 10 at line sensor 20M, as described with reference to FIG. 1H. This embodiment allows service providers to offer centralized monitoring and/or control of both circuit-switched calls between the public circuit-switched network 12 and the customer private circuit-switched network, and real-time packet-switched calls between the public packet-switched network 14 and components (e.g., end-user stations 18) on the customer private packet-switched network 40, pursuant to a security policy 202.

It is understood that one or more lines, trunks, and/or cabling may be mapped through any single line sensor 20 (e.g., line sensor 20A and 20B show connectivity with multiple circuit-switched lines). Although not shown, any single line sensor 20 may be connected on both the circuit-switched network and/or the packet-switched network, the line sensor 20 being located in accordance with the configuration of lines and cabling, and in accordance with the enterprise's desired level of security and resource management. Accordingly, the security policy 202 that is downloaded to the line sensor 20 may be configured to address both circuit-switched and/or packet-switched calls.

As represented by the line sensor 20A-20M and its corresponding line(s), it is understood that the line sensor 20 is configured to map the station extensions, direct connect lines, trunks, and/or cabling through the line sensor 20. The system 10 is transparent to the end-user stations 16 and 18, the central office, the PBX 28, the media gateway 44, the call server 54, and the IP firewall 56, unless the security policy 202 designates authentication of remote access or termination of a call (i.e., all lines and cabling terminate at the same points as prior to installation of the line sensor 20, call traffic is uninterrupted if power is removed from the line sensor 20, call traffic is uninterrupted if a call is in progress when the line sensor 20 comes on-line, and the call content received by the destination is identical to the call content transmitted by the source).

Referring to FIG. 2, a functional schematic 200 illustrates certain operational aspects of the system 10. An example (very simplified) security policy 202 is shown for monitoring and/or controlling the flow of calls through the line sensor 20. As exemplified in FIG. 2 and discussed below and in further detail later with reference to FIG. 3 and 4, the security policy 202 is administrator-configured, and implements a rule-set designating at least one action to be performed based upon at least one attribute of an incoming and/or outgoing call. It is understood that the rule-set is implemented by software instructions within the line sensor 20 and remote management server 22 that may be programmed or modified at either the line sensor 20 or at the remote management server 22 located nearby or at a very remote distance therefrom. It is further understood that since any single line sensor 20 may be connected on both the circuit-switched network and the packet-switched network, the security policy 202 that is downloaded to the line sensor 20 may be configured to address both circuit-switched and packet-switched calls.

A call log 204 is constructed for each call, consisting of concatenated call event records, and stored in a database on the remote management server 22. Real-time ongoing and historical call log(s) 204 are viewed and printed from the remote management server 22. Although the call log 204 shown in FIG. 2 is a very simplified example, the administrator-designated level of detail of the call log 204 ranges from verbose (including all call attributes, all call events, and all actions and tracking functions performed), to very brief (including only selected call attributes, call events, actions and tracking functions).

The call log 204 details, attributes determined by the line sensor 20, and security policy 202 rule criteria that are common to both monitoring and/or controlling calls on circuit-switched and packet-switched networks includes one or more of the following:

Call Key—a unique identifying key assigned to each call by the line sensor 20;

Line sensor Name—the designated alias of the line sensor 20 processing the call and enforcing the rule;

Line sensor Group—the designated alias of the group (or array of line sensors 20) to which the line sensor 20 processing the call belongs;

Start Date—the start date of the call;

Start Time—the start time of the call;

Direction—whether the call is inbound or outbound;

Raw Destination Information—the digits dialed or information preceding call connection, including prefix, the base destination phone number or information, suffix, etc.;

Source—extension assigned to the end-user station 16 for outbound calls, number extracted from Caller ID (or other means) for inbound calls, mask, IP address, IP subnet (IP address and netmask), port, user agent, user identifier (e.g., john.doe@company.com), uniform resource identifier (URI), domain, etc. where the source is initiating the call;

Source Name—alias of the source initiating the call;

Destination—extension assigned to the end-user station 16 for outbound calls, number extracted from Caller ID (or other means) for inbound calls, mask, IP address, IP subnet (IP address and netmask), port, user agent, user identifier (e.g., john.doe@ company.com), uniform resource identifier (URI), domain, etc. where the destination is receiving the call;

Destination Name—alias of the destination receiving the call;

Connect Time—the time at which the call was answered (connected);

Security Policy—the designated alias of the security policy 202 containing the matched (fired) rule;

Rule Number.—the number of the rule that matched the determined call attributes and therefore fired;

Call-Type—the type of call/payload (e.g., voice, fax, modem, voice energy, modem energy, STU-III-data, STU-III-voice, STU-III-unspecified, wideband data, wideband video, video, IP voice, FNBDT, TTY/TDD, busy, unanswered, undetermined, etc.);

Call Content—designated keyword (predefined sequence of digital data) detected in calls via speech recognition or demodulated modem and/or fax data;

Actions—designated actions executed by the line sensor 20, pursuant to the security policy (i.e., allowing or denying the call);

Tracks—additional actions and tracking functions executed, pursuant to the security policy 202 (e.g., line sensor 20 additional actions include: recording call content, redirecting the call, authenticating remote access, monitoring call content for keywords, conducting the call in encrypted mode; remote management server 22 tracking functions include: adjusting the security policy, logging call events, generating notification alerts and generating reports);

Redirect—the port and name of the peripheral device the call is redirected to;

Post-connect information—digits/information sent after the call is connected;

Log Time—the date and time a call event record is appended to the call log 204;

Call Log Comment—Comments included in the call log 204, for the benefit of the system administrator, which are associated with the fired rule and call event (e.g., unauthorized outbound modem; keyword detected in call content; call content recorded, bandwidth threshold exceeded, etc.);

End Date—the date the call ended;

End Time—the time the call ended; and

Duration—the duration of the call (in seconds).

The call log 204 details, attributes determined by the line sensor 20, and security policy 202 rule criteria that are common to both monitoring and/or controlling calls on circuit-switched networks includes one or more of the following:

Line—the identifier for the line (extension, direct connect, etc.) carrying the call;

Trunk—the PBX trunk through which the call is processed;

Channel—the channel through which the call is processed;

Prefix—all digits or information preceding the base destination, including outside access number, long distance access code, etc.; and Suffix—all digits or information following the base destination, including DTMF-based Personal Identification Number (PIN) code used in authentication for remote access, calling card numbers, etc.

The call log 204 details, attributes determined by the line sensor 20, and security policy 202 rule criteria that are common to both monitoring and/or controlling calls on packet-switched networks includes one or more of the following:

Codec—method of audio signal encoding used for real-time packet-switched call (e.g., G.711, G.723, G.729, etc.);

Bytes from Source—number of bytes transferred from the source of the call;

Bytes from Destination—number of bytes transferred from the destination of the call;

Packets from Source—number of packets transferred from the source of the call;

Packets from Destination—number of packets transferred from the destination of the call;

Source Transmission Rate—the rate of packet traffic from the call source in bytes/second;

Destination Transmission Rate—the rate of packet traffic from the call destination in bytes/second;

Source Latency—period of delay (seconds or milliseconds) in the arrival of packets from the call source;

Destination Latency—period of delay (seconds or milliseconds) in the arrival of packets from the call destination;

Source Jitter—period of deviation in latency (milliseconds or microseconds) of packets from the call source;

Destination Jitter—period of deviation in latency (milliseconds or microseconds) of packets from the call destination;

Source Packet Loss—difference between the number of expected packets (based on sequence numbers, headers, the number of packets seen for the same call at another point in the network, etc.) and the number of packets that actually arrived from the call source;

Destination Packet Loss—difference between the number of expected packets (based on sequence numbers, headers, the number of packets seen for the same call at another point in the network, etc.) and the number of packets that actually arrived from the call destination;

Virus—a virus is in the media or signaling stream;

Anomalous call—unexpected expected call attribute or set of attributes given previous call history or user defined limits;

Malformed packet/message—a poorly formed message (i.e. too long, too short, incorrect fields, etc) in the signaling or media stream;

Signaling or media protocol version; and

Total Bandwidth—total number of bytes transferred from both the source and the destination.

It is further understood that the above listing is by no means exhaustive, and that any call attribute available on lines which carry a call, packet, or call information through the line sensor 20 may be used to configure rules, enforce the security policy 202, provide visibility, call activity logging, and reporting on inbound and outbound calls.

A recording module 205, located within the line sensor 20, records the raw binary stream of designated calls, pursuant to the security policy 202, and archives the data on the remote management server 22, located nearby or a great distance therefrom. The line sensor 20 temporarily caches the recorded content if the connection between the remote management server 22 and the line sensor 20 is lost. Several configurations are contemplated, including those whereby the functions of the recording module 205 are accomplished within the line sensor 20, within the remote management server 22, or using a separate peripheral recorder 236 to which calls are redirected pursuant to the security policy 202.

Pursuant to the security policy 202, a VPN module 214, located within the line sensor 20, encrypts and transmits, receives and decrypts designated calls, thereby constructing a virtual private network (VPN) across the public circuit-switched network 12 or the public packet-switched network 14, between two line sensors 20, one located at each end of the call. If the security policy 202 designates that a call is to be conducted in encrypted mode, capabilities are negotiated between the two line sensors 20 and the call is conducted in encrypted mode without any action being taken by the called or calling parties to secure the call.

Encrypted transport of a call across the public circuit-switched network 14 and/or the public packet-switched network 16, from a first line sensor 20 location to a second line sensor 20 location, is implemented between one or more end-user stations located at the first enterprise location and one or more end-user stations located at the second enterprise location. The method includes the steps of: (1) defining at least one rule associated with the end-user stations at the first enterprise location, which designates the call is to be encrypted, based on at least one attribute of the incoming or outgoing call to/from the first enterprise location; (2) defining at least one rule associated with the end-user stations at the second enterprise location, which designates the call is to be encrypted, based on at least one attribute of the incoming or outgoing call to/from the second enterprise location; (3) determining the at least one attribute of the incoming or outgoing call to/from the first enterprise location; (4) determining the at least one attribute of the incoming or outgoing call to/from the second enterprise location; (5) performing the at least one action (encrypting the call) designated in the at least one rule associated with the end-user stations at the first enterprise location; and (6) performing the at least one action (encrypting the call) designated in the at least one rule associated with the end-user stations at the second enterprise location.

It is contemplated that the system 10 may conduct a circuit-switched call in encrypted mode using one of several different methods, such as those described in greater detail in U.S. patent application Ser. No. 09/709,592, entitled "A System and Method for Encapsulation, Compression and Encryption of PCM Data;" U.S. patent application Ser. No. 10/200,969, entitled "Encapsulation, Compression and Encryption of PCM Data;" U.S. patent application Ser. No. 10/625,311, entitled "An Improved Virtual Private Switched Telecommunications Network;" and U.S. patent application Ser. No. 10/649,204, entitled "An Improved Virtual Private Switched Telecommunications Network;" all assigned to the assignee of the present invention and incorporated herein by reference. Similarly, two line sensors 20 conduct a call in encrypted mode on a packet-switched network using IPSEC and/or other security standards to encrypt the voice payload inside the packet, pursuant to the security policy 202. Capability negotiation, authentication and key management, is performed, although steps such as requesting a clear channel, synchronization, and compressing the payload, etc. are not necessary, as will be understood by those skilled in the art.

The report module within the remote management server 22 consolidates and manages designated call log 204 data for use in assessing an enterprise's resource usage and/or security posture. The numeral 206 represents at least one of a group of reports such as a post-event report 218, a schedule-generated report 220, or an ad hoc report 222, which may be initiated, or scheduled for later generation and delivery via a graphical user interface-based report module (not shown).

Reports are configuration-edited, generated, archived, displayed and printed via the remote management server 22. Report criteria includes: the date/time range for which call log data will be retrieved; call log 204 fields to be used; data organization (sorting, filtering, grouping, ordering); data presentation level (in detail or high level summary); and data display format (charts, graphs, or trends). It is understood that any configurable report, and any number of reports may be scheduled for generation and display, printing, or delivery at any discrete time or number of recurring time(s).

The post-event report 218 contains predefined information concerning a designated call event and is generated responsive to the call event, pursuant to the security policy 202.

The schedule-generated report 220 contains previously designated categories of call log data and is automatically generated, displayed, printed, and delivered at previously designated, discrete or recurring times and/or days. The schedule-generated report 220 is delivered to the designated recipient(s) by electronic mail message, to the designated file directory on a network- or web-accessible server, and/or to the designated archival file directory.

The ad hoc report 222 is manually initiated by authorized personnel. Both the schedule-generated report 220 and the ad hoc report 222 may include, for example, batch analysis of call log data for trending or difference/comparison reporting, either in great detail or high-level summary.

The remote management server 22 generates several types of alerts pursuant to the security policy 202, including, for example: electronic mail notification 224, pager alerting 226, console messaging (not shown), and SNMP trap notification (not shown). Alert contents are administrator-configurable, derived from the call log 204 data, and may include, for example: rule number fired, call source, call destination, call type, line sensor 20 group and name, security policy name, designated keywords found in call content, date, and time.

The numeral 228 represents at least one of a group of peripheral devices to which the system 10 redirects the call or an in-progress copy of the call, pursuant to the security policy 202. The peripheral devices 228 may include, for example: a security listening station 230, a data Network Intrusion Detection System (NIDS) 234, and the recorder 236. While not shown, it is understood that the security policy 202 can also be configured such that any call to or from one or more designated end-user stations 16 and 18, source, or destination is redirected to a different end-user station 16 and 18 or destination. Several configurations are contemplated, including those whereby all functions and operations of the NIDS 234 are accomplished within the line sensor 20; or within the remote management server 22; or using a separate computer system(s), to which calls are redirected for analysis, any of which may be located nearby or a great distance therefrom.

Figure 3:
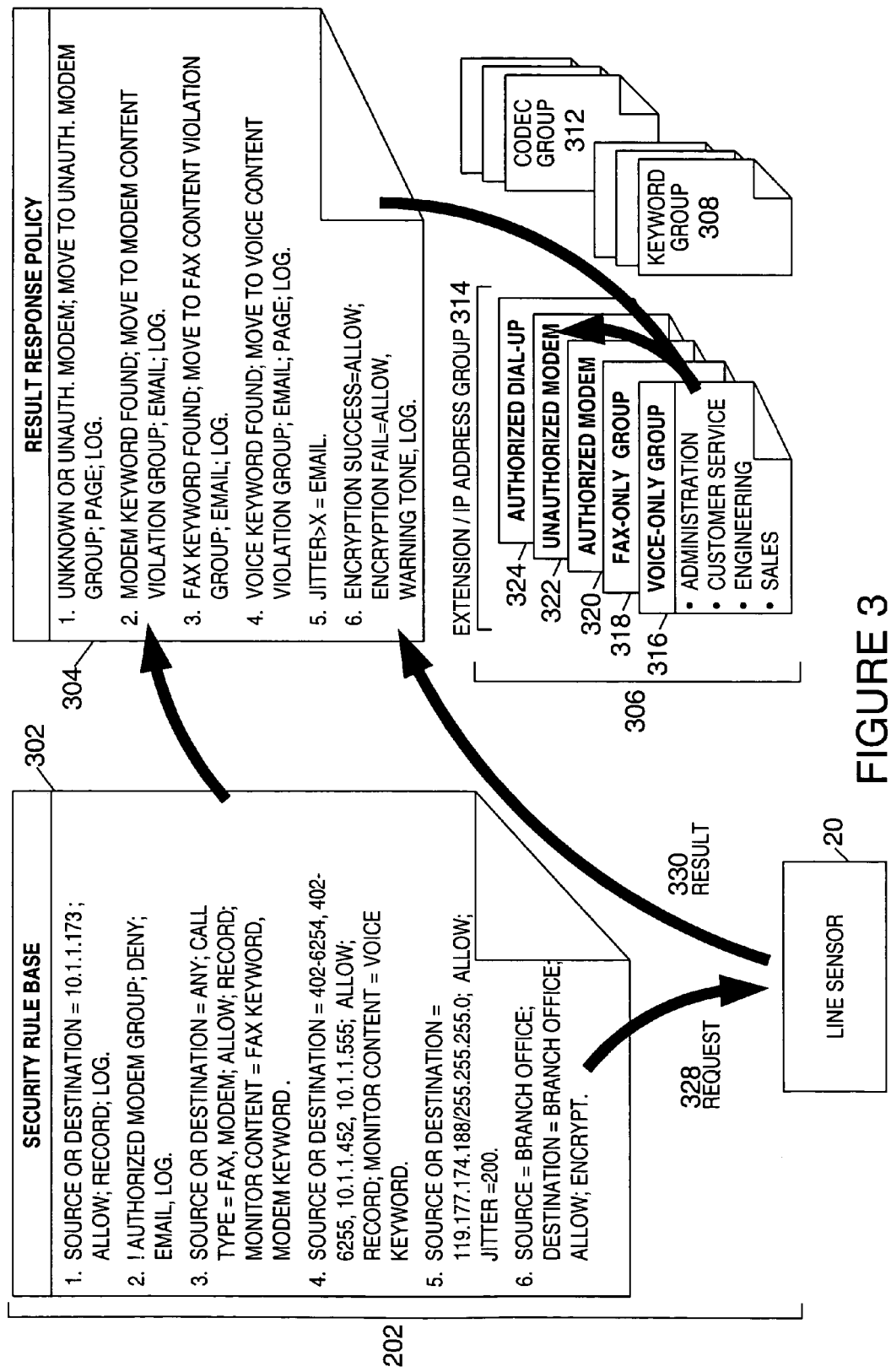
FIG. 3 is a functional block diagram illustrating simplified example security policy elements and interactions of a simplified example security policy for use by the system of FIGS. 1A–1L.

FIG. 3 is a schematic block diagram of the exemplary security policy 202 for enforcement by the system 10. As described below, the security policy 202 is made up of one or more rules designating at least one action to be performed based on at least one attribute of the incoming or outgoing call between the public circuit-switched network and/or the public packet-switched network and the one or more end-user stations located within the enterprise's one or more locations.

The line sensor 20 compares the determined call attributes with the rules in the security policy 202, moving through the rule-set in sequential order, until either all criteria in a rule is met, or no rules meet the call attributes. It is understood that the security rule base 302 and result response policy 304 may include any number and types of rules, constructed using boolean combination (AND, OR, NOT) of any of the call attributes contained in the call log 204 and previously described with reference to FIG. 2.

The rule-set is exited after any one rule matches the determined call attributes. Because call-type detection is continuous during the call, change in call-type during a call is detected. Consequently, each rule in the security policy 202, except for the rule already fired by the call's previous attribute, is re-evaluated in sequential order, using the updated call-type attributes. Actions and track functions are then performed based upon the rule matched with the updated call attribute. It is understood that the system 10 is capable of operating in a continuous processing loop, including detecting call attributes and analyzing call activity while simultaneously performing actions in accordance with the rules in the security policy 202. Any combination of action(s) or tracking function(s) may be included in the security rule base 302 and result response policy 304, pursuant to the enterprise's telephony security and resource management needs.

When designated in a rule, the following actions (and tracking functions) are performed by the line sensor 20:
  allowing the call,
  denying the call,
  redirecting the call;
  recording the call content,
  encrypting the call,
  sending a tone,
  sending a message,
  authenticating an inbound call for remote access, and
  monitoring the call content for keywords.

When designated in a rule, the following actions (tracking functions) are performed by the remote management server 22:
  logging the call,
  generating a report,
  generating an alert, and
  adjusting the security policy.

Each rule includes the line sensor 20 location/identifier "install on," allowing the system administrator to implement one security policy 202 containing rules to be applied to specific, designated line sensors 20.

As shown in FIG. 2, the security policy 202 may include one or more security rule bases 302, one or more corresponding result response policies 304, and one or more groups 306 for a large globally distributed enterprise, however, for the sake of clarity and simplicity, only one of each component is shown in this diagram. The one or more groups 306 may be for example: a keyword group 308, a codec group 312, and extension groups 314. Although shown schematically herein a more complex and detailed example of the security rule base 302 and result response policy 304 is discussed and illustrated in greater detail in U.S. patent application Ser. No. 09/907,089 entitled TELEPHONY SECURITY SYSTEM.

The security rule base 302 is a sequential listing of rules, residing within the security policy 202 in the remote management server 22 and the line sensor 20. The security rule base 302 designates at least one action to be performed based on at least one determined attribute of the incoming or outgoing call. For example, a rule within the security rule base 302 might read "Allow inbound modem calls from any number in the maintenance dial-up group to any extension in the dial-up systems group, record call content, monitor call content for modem keywords, generate email, and log the event."

In the present example, the security rule base 302 designates: (1) record call content on a designated IP phone; (2) deny unknown or unauthorized modems; (3) record and monitor call content of all fax and modem calls; (4) record and monitor call content of all fax and modem calls, and calls on designated telephones and IP phones for designated keywords; (5) allow calls to/from IP phones, email if jitter exceeds designated threshold; (6) conduct any intra-enterprise voice call in encrypted mode.

The result response policy 304 is a sequential listing of response rules (similar in construction to the security rule base 302), which define the appropriate response to: call events; designated call attributes (e.g., the source's or destination's current group); the fired rule containing "adjust policy" as a track function (action); and a result 330 of a threat assessment or an attempted action such conducting the call in encrypted mode. The result response policy 304 defines whether the call will be allowed or denied, or whether other actions will be performed, such as: playing a tone or message to the called/calling parties; generating an alert; generating a report, and automatically adjust the security policy (i.e., the remote management server 22 moves the designated source or destination from its current group to another different, designated group).

Threat assessments (TA) are actions performed by the line sensor 20 which include for example: authentication (via detection of dialed DTMF digits) of call sources attempting to remotely access enterprise telephony resources; monitoring the content of calls for designated keywords; monitoring calls for the presence of patterns of interest; and monitoring modem content for the presence of data of interest. The TA result 330 (i.e., the success or failure in authenticating the call source, identifying designated keywords, identifying patterns of interest, and/or data of interest), is used to identify an appropriate response to the assessment, pursuant to the result response policy 304.

In FIG. 2, the result response policy 304 designates: (1) adjust the security policy by moving the extension/IP address (i.e., identifier) of any modem call that is from/to an unauthorized source/destination into the unauthorized modem group; (2) adjust the security policy by moving the extension/IP address of any unknown or unauthorized modem into the unauthorized modem group on their first use; (3) adjust the security policy by moving the extension/IP address of any authorized modem call, found to contain designated keywords, into the modem content violation group; (4) adjust the security policy by moving the extension/IP address of any authorized fax call, found to contain designated keywords, into the fax content violation group; (5) adjust the security policy by moving the extension/IP address into the voice content violation group, if the call content is found to contain designated keywords; (6) allow successfully encrypted calls between extension/IP address in the intra-enterprise group; allow calls between extension/IP address in the intra-enterprise group that failed to be encrypted, but sound a warning tone.

It is contemplated that the system 10 will make extensive use of groups 306 as a portion of the security policy 202. Objects such as sources, destinations, call types, keyword digital data sequences, codecs, PIN codes and extensions/IP addresses (i.e., identifiers) may be "bundled" together in logical groups 306 and collectively referred to by meaningful aliases for ease of management and convenience in applying rules (shown schematically herein as groups 308, 312, and 314 and discussed and illustrated in greater detail in U.S. patent application Ser. No. 09/907,089 entitled TELEPHONY SECURITY SYSTEM). The keyword groups 308 is an example of grouping aliases for administrator-configured digital data sequences configured in keyword libraries to facilitate detection of keywords in call content that indicate improper behavior, security issues, or inappropriate use of telephony resources. It is understood that groups may overlap one another and even contain other groups entirely.

As shown in FIG. 3, when the security rule base 302 or the result response policy 304 designate that the security policy is to be adjusted, the remote management server 22 removes an extension from its current extension group and places the extension into a different, designated extension group (e.g., removes an extension from the voice-only group 316 and places it in the unauthorized modem group 322), thereby altering the way in which the system 10 monitors and/or controls future calls to and from the moved extension.

Figure 4A:
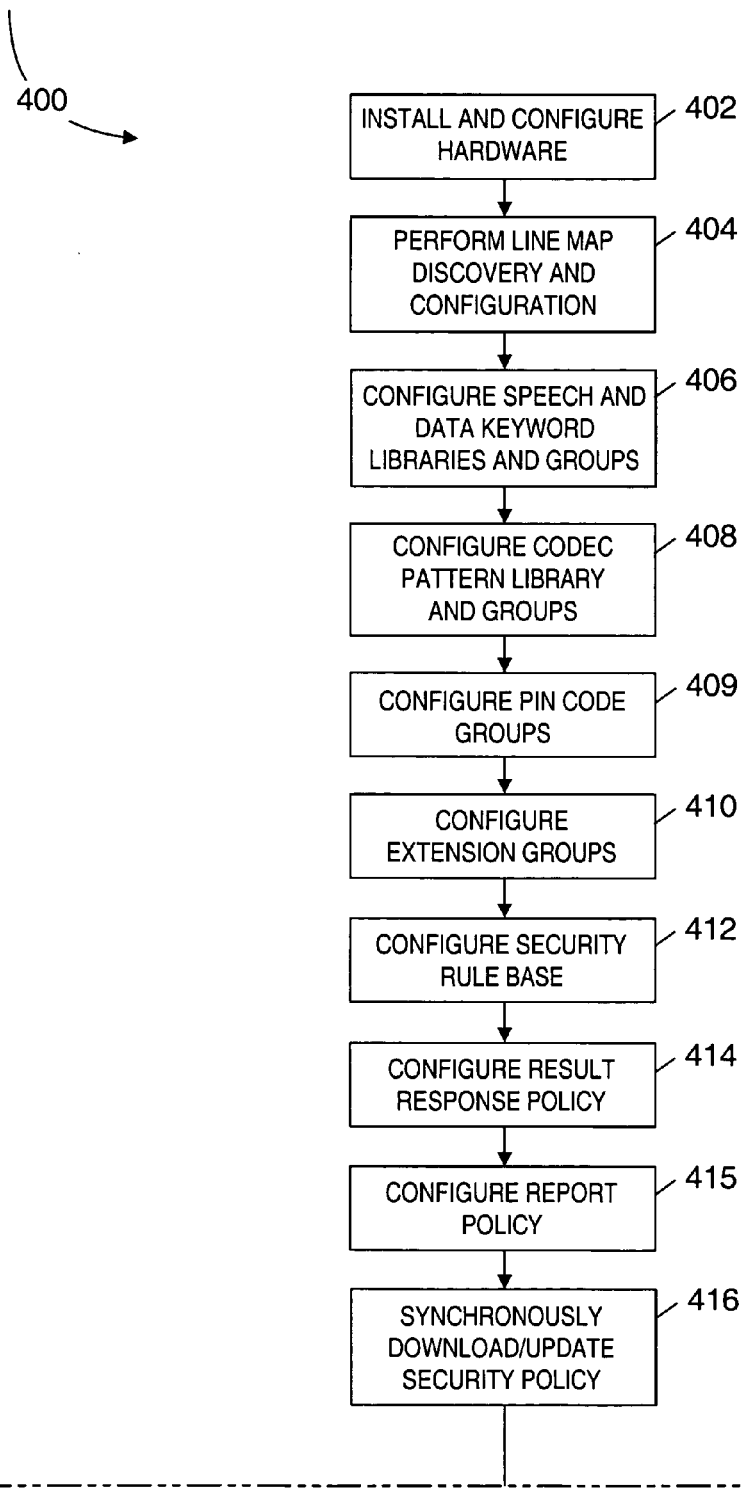
FIGS. 4A, 4B, and 4C are a process flow diagram illustrating installation, configuration and operational processes of the system of FIGS. 1A–1L.
Figure 4B:
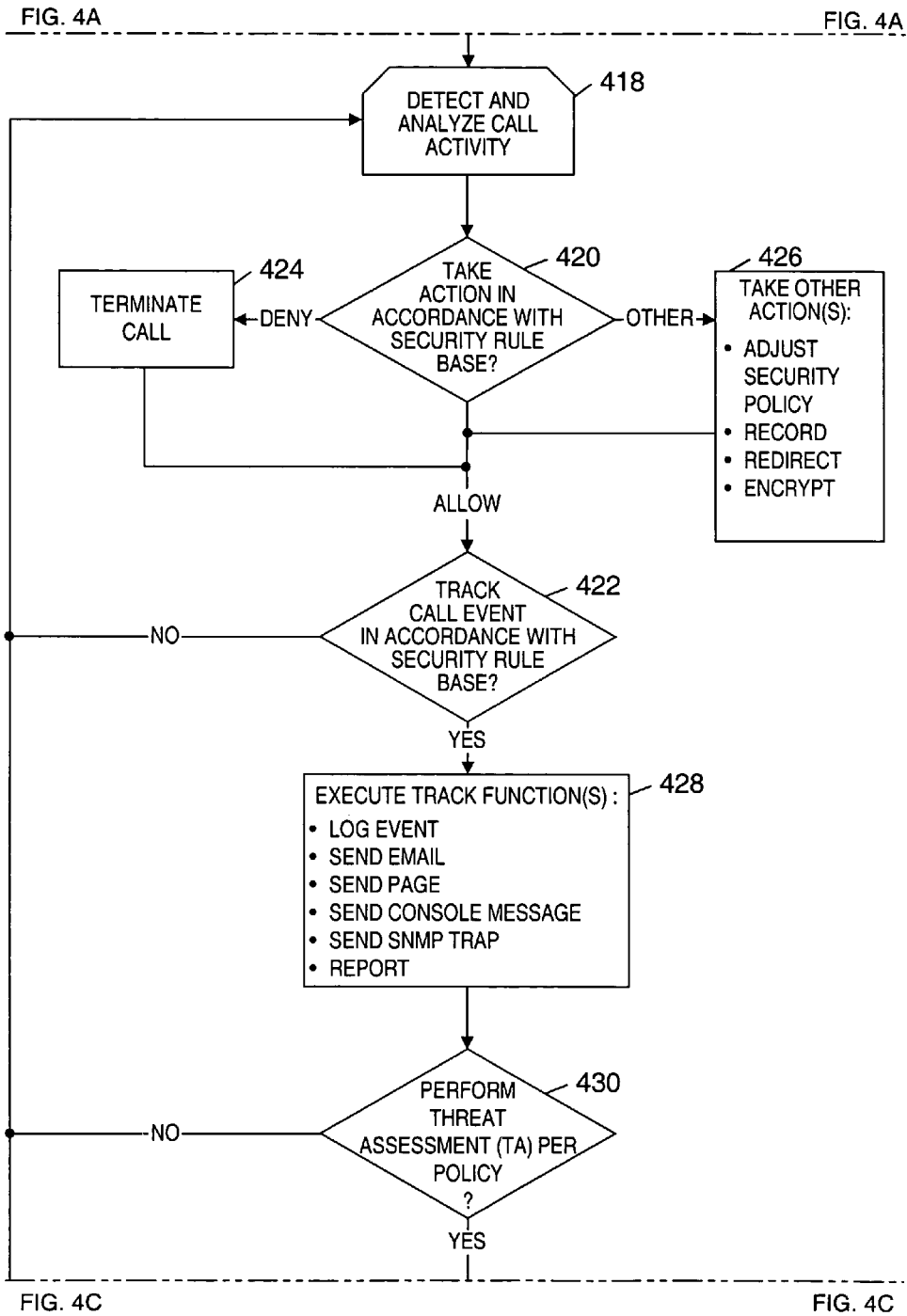
Figure 4C:
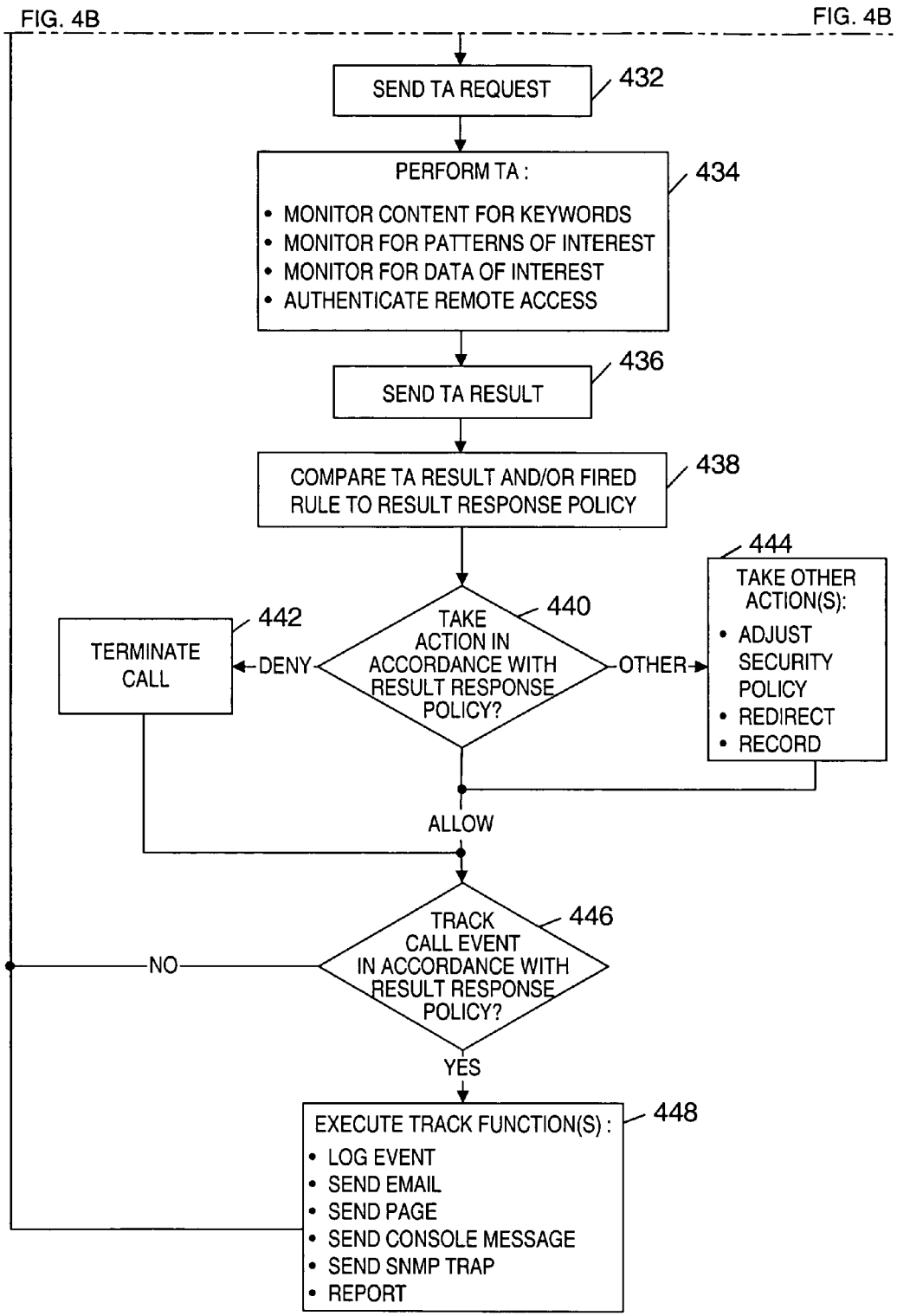

FIGS. 4A, 4B, and 4C together show a process flow diagram 400 illustrating installation, configuration and operation processes for the system 10. Once installed and configured, it is understood that the system 10 is capable of operating in a continuous loop, detecting and analyzing call activity and performing threat assessments while simultaneously performing appropriate actions, tracking functions, and responses in accordance with the rules in the security policy 202.

Referring to FIG. 4A, in steps 402 and 404, the process of system installation and hardware configuration, and the process of line map discovery and configuration are performed. Step 406 refers to building speech, fax and modem keyword libraries and configuring the keyword groups 308. Step 408 refers to building the codec pattern library and configuring the codec groups 312. In step 409, the PIN code groups are configured. In step 410, the extension/IP address (i.e., identifier) groups 314 are configured. Step 412 refers to security rule base 302 configuration. Step 414 refers to response policy 304 configuration. It is understood that the system administrator may perform steps 406–414 to configure the security policy 202 and the line sensor 20 from the remote management server 22, and download the configurations to one or more line sensors 20. Alternatively, the system administrator may interact directly with the one selected line sensor 20 via a terminal or terminal emulator connected to a serial port on the line sensor 20 or via a Telnet connection over the network. The line sensor 20 may be configured to allow direct administrator interaction via: (1) the serial port connection only; (2) the serial port and the remote management server 22 only; or (3) the serial port, remote management server 22, and Telnet.

In step 415, the report policy is configured, thereby formatting and designating report criteria, generation and delivery parameters for the post-event reports 218 and the schedule-generated reports 220. In step 416, the security policy 202, line sensor 20 configurations, keyword and pattern libraries, modifications to each, and software upgrades are synchronously downloaded from the remote management server 22 to one or more line sensors 20, which are designated to receive the same groups, security policy, configurations, etc., in one or more locations within the enterprise. Conversely, any number of individually distinct groups, security policies, configurations, and modifications may be downloaded to designated line sensors 20 from the remote management server 22 or programmed and modified directly at the line sensor 20.

Referring now to FIG. 4B, the process of call detecting and analyzing call activity begins in step 418. For each end-user station 16 and 18, and each packet-switched network element connected through the line sensor 20, the line sensor 20 captures and analyzes call activity, then consolidates and reports details of the activity for further processing.

An aspect of this process involves the ability of the line sensor 20 to distinguish voice, fax, modem, STU-III-voice, STU-III-data, STU-III-unspecified, wideband data, wideband video, video, IP phone, FNBDT, TTY/TDD, busy, unanswered, and undetermined call types. Call type determination on a circuit-switched call is performed by the line sensor 20 using the received media data stream. The line sensor 20 receives the media stream and either converts it to a linear PCM format or leaves it in a compressed format. The actual call type determination algorithm processes either the linear PCM data or the compressed data directly.

Having collected the media stream, the line sensor 20 processes the digital signal to determine the frequency domain and time domain components of the signal. The line sensor 20 detects tone sequences, demodulates signaling handshakes, decodes message streams, and otherwise characterizes the signal contents. Based on these inputs, the line sensor 20 determines the call type.

Further analysis of call activity involves the ability of the line sensor 20 to discriminate codecs, and to detect keywords in call content via speech recognition or demodulated modem/fax data. Because the system 10 operates in a continuous processing loop, analyzing call activity while simultaneously performing appropriate actions and responses, change in call attributes during a call (e.g., call type, digits entered after call connection, codec, transmission rate, latency, jitter, etc.) are also detected.

In step 420, call attributes are compared to the rules in the security rule base 302, and pursuant to the security rule base 302, a determination is made whether to allow or deny the call. As previously described, the security rule base 302 is configured to meet the security needs of the enterprise, which may include allowing the call, in which case execution proceeds directly to step 422, denying the call, in which case execution proceeds to step 424 to cause the call to be terminated, or performing other actions including: adjusting the security policy; recording call content; redirecting the call to another end-user station 16, 18, or designated peripheral device 228; and conducting the call in encrypted mode; in which case execution proceeds to step 426. It is understood that the system administrator may manually perform preemptive or complementary actions including those described above, at any time, either at the line sensor 20 or from the remote management server 22.

In step 422, a determination is made whether the security rule base 302 designates tracking functions to be performed. If so, in step 428, the remote management server 22 performs tracking functions, such as event logging, generating email, pager, console messaging and/or SNMP notifications, and/or generating designated reports.

In step 430, a determination is made whether the security rule base 302 designates performance of a threat assessment (action), including for example: monitoring call content for keywords; monitoring the call for the presence of patterns of interest; monitoring the call for the presence of data of interest; and initiating an authentication for remote access, as shown in step 434. If so, execution proceeds to FIG. 4C and step 432, in which a TA request 328, containing all necessary information to execute the assessment, is sent to the specific system module or component that performs the designated threat assessment. In step 434, the module or component executes the designated threat assessment, such as detecting and identifying designated keywords in call content. The assessing module or component sends the result of the assessment, the TA result 330, in step 436.

In step 438, the line sensor 20 compares the TA result 330 and/or the criteria of the fired security rule base 302 rule with the rules in the result response policy 304. In step 440, a determination is made, pursuant to the result response policy 304, to either: (1) deny the call, in which case execution proceeds to step 442 to cause the call to be terminated; or (2) allow the call and perform other actions including for example, adjusting the security policy, and redirecting the call to another end-user station or peripheral device 228, in which case execution proceeds to step 444; or (3) allow the call with no additional actions, in which case execution proceeds directly to step 446. In step 446, a determination is made, pursuant to the result response policy 304, whether the remote management server 22 performs tracking functions such as event logging, generating email, pager, console messaging and/or SNMP notifications, and/or generating designated reports in step 448. Although not shown, it is understood that additional threat assessments may be designated in step 444, in which case execution returns to step 430–436. If the process returns to step 430–436, actions and responses are performed based upon the latest TA result 330 in step 438.

The processes used by the line sensor 20 to detect and analyze call activity, and determine call attributes of calls on circuit-switched networks is discussed and illustrated in greater detail in U.S. patent application Ser. No. 09/907,089 entitled TELEPHONY SECURITY SYSTEM. Also under microprocessor control, the line sensor 20 analyzes real-time packet-switched call and call information to determine call attributes for use implementing the security policy 202. The line sensor 20 uses protocol decoding and if required, decryption. The protocol packets are inspected in a stateless and/or stateful system to provide voice application security for any underlying transport such as H.323, Session Initiation Protocol (SIP), Media Gateway Control Protocol (MGCP), Media Gateway Protocol (Megaco), and proprietary protocols. Protocol packets are passed unchanged, rewritten, and/or encrypted as required by network topology or the security policy 202. Attributes are determined from the protocol packets including but not limited to source, destination, call type, codec, etc.

Media (payload) packets are decoded and if required, decrypted. The data from the media packet is analyzed as required by the security policy 202, which may include any or all of demodulation, tone detection, speech recognition, keyword detection, and software virus/worm detection, to monitor media packets for call content. This call content can be compared with the content type determined in the protocol and policy. Media packets are passed unchanged, rewritten, and/or encrypted as required by network topology or the security policy 202. The line sensor 20 uses any or all of a range of means to enforce the security policy 202. It can block protocol packets, block media packets, generate protocol packets, and generate media packets.

To enforce the security policy 202 and provide visibility, call activity logging, and reporting on at least all inbound and outbound real-time packet-switched calls, the basic components of the line sensor 20 includes: (1) a network or line interface; (2) a protocol processor; (3) a call data processor; (4) a security policy processor; (5) data logging memory; and (6) an administration interface. However, it will be understood by one skilled in the art that the system components listed above represent only one logical way to subdivide the functions of the line sensor 20. The functions may be subdivided into many more components or even fewer components.

The network interface physically and electrically connects the line sensor 20 to the network, recovers the digital signal from the network, and passes the digital data to the protocol processor. The network interface also receives data from the protocol processor and transmits the data onto the network.

The protocol processor inspects the data from the network interface and identifies messages. It may also inspect the messages and locate the messages that make up a real-time packet-switched connection. The protocol processor may also remove the call data from the message and pass it to the call data processor. The protocol processor also passes the call control data including source, destination, call type, compression format, etc. to the security policy processor. Finally, depending upon the results from the security policy processor, the protocol processor may send the call data back to the network interface for retransmission. Alternatively, the protocol processor may send a message to terminate the call or may modify the contents of the call data before retransmission.

The call data processor inspects the data from the protocol processor and may decompress the data, demodulate the data, perform tone detection, perform call type discrimination, or other data analysis. The call data processor reports the results of these tasks to the security policy processor. The call data processor may also generate call data that may be used by the policy processor to generate a new call or modify an existing call.

The security policy processor inspects the call control data and the results from the call data processor. It then compares these determined attributes with the security policy 202 and determines if the call matches a rule. Pursuant to the policy, the security policy processor may command the protocol processor to retransmit the call without modification, or the security policy processor may command the protocol processor to terminate the call, modify the call data, send a message to a user, or perform some other action. Pursuant to the security policy 202, the security policy processor may also log the call, record the call data, or generate an alert.

The administration interface provides a means for the user to view and edit the security policy, generate reports that summarize call activity, review error logs and diagnostics, and configure the line sensor parameters. The administration interface transmits the security policy 202 and other configuration parameters to the security policy processor and other system components. It also receives data status and log data from the other system components for summary and display to the user.

In one embodiment, the administration interface of the line sensor 20 is an application running on the data network. In this embodiment, the administration interface may be physically remote from the rest of the system 10. The administration interface may also be designed to provide administration for many line sensors 20 and can remotely consolidate all activity and data from many line sensors 20 into a single summary for the administrator. Likewise, the administration interface can uniformly distribute security policies 202 to all line sensors 20 or any subset thereof.

The inventive functions performed by the present invention may be implemented with commercially available components as will be understood by those skilled in the art. Although not shown, it is understood that the line sensor 20 is controlled by computer programming instructions stored in memory within the line sensor 20 and which may also be stored in memory within other components of the system 10 connected to the line sensor 20.

It is understood that the present invention can take many forms and embodiments. The embodiments shown herein are intended to illustrate rather than to limit the invention, it being appreciated that variations may be made without departing from the spirit of the scope of the invention. For example, any number of different rule criteria for the security policy 202 may be defined. Different attribute descriptions and rule descriptions are contemplated. The algorithms and process functions performed by the system 10 may be organized into any number of different modules or computer programs for operation on one or more processors or workstations within the system 10. Different configurations of computers and processors for the system 10 are contemplated. The programs used to implement the methods and processes of the system may be implemented in any appropriate programming language and run in cooperation with any hardware device. The system may be used for enterprises as small as a private home or business with just a few phone lines as well as for large enterprises with multiple PBX locations around the world, interconnected in one or more private networks or virtual private networks.

Multiple configurations are contemplated, including those wherein some or all of the functions of the remote management server 22 may be inserted into the system 10 at the line sensor 20. In an alternate embodiment, the functions of the line sensor 20 and the remote management server 22 may be inserted into the system 10 at a management line sensor (not shown) which performs some or all management server functions for all associated line sensors 20, in addition to performing all monitoring and/or controlling functions of a typical line sensor 20.

In an alternate embodiment, the management line sensor is dedicated to providing the management server functions and operations for all associated line sensors 20, and will not perform the typical monitoring and/or controlling functions of the other line sensors 20. Embodiments are contemplated wherein any of the operations and features described within this document with reference to the line sensor 20 and the remote management server 22, and their associated hardware and software components, may be implemented without a corresponding use of other operations, features and components. It is also contemplated that the line sensor 20 will process both real-time packet-switched traffic and traffic that is not real-time packet-switched traffic.

The line sensor 20 may be installed in many different locations within the circuit-switched network and/or the packet-switched network. The components of the line sensor 20 may all reside within the same device, or they may be distributed. Each of the components may consist of computer software components or electronic hardware components, or a combination of software and hardware.

As with the administration interface, the other line sensor 20 components may be physically remote from each other. In these cases, the remote line sensor component may perform its function for many line sensors 20.

The line sensor 20 may be collocated or integrated into any number of existing packet-switched network elements, including the media gateway 44, the IP firewall 56, the IP telephone 46, a gateway router, a CSU, a network hub, a network router, a bridged router, or other network device. The line sensor 20 may also be collocated or integrated into circuit-switched network elements, such as the PBX 28. If the line sensor 20 is integrated with another packet-switched network component such as a media gateway or IP Telephone, the administration interface can also provide distributed visibility and control of the functions and configuration parameters of the integrated component.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

While the present system and method has been disclosed according to the preferred embodiment of the invention, those of ordinary skill in the art will understand that other embodiments have also been enabled. Such other embodiments shall fall within the scope and meaning of the appended claims.

What is claimed is:

1. A telephony security system located within one or more locations of an enterprise for monitoring and/or controlling incoming and outgoing calls between a public circuit-switched network for provision of circuit-switched circuits to the public, wherein a physical circuit is temporarily established on demand and kept reserved for the user until the network receives a disconnect signal and one or more end-user stations located within an enterprise's one or more locations, said telephony security system comprising:

one or more rules associated with the one or more end-user stations located within the enterprise's one or more locations, said one or more rules associated with the one or more end-user stations located within the enterprise's one or more locations designating at least one action to be performed based on at least one attribute of an incoming and outgoing call between the public circuit-switched network and the one or more end-user stations located within the enterprise's one or more locations, said at least one attribute of the incoming and outgoing call between the public circuit-switched network and the one or more end-user stations located within the enterprise's one or more locations is from a group including:

the call direction,
   the call source,
   the call destination,
   the call type,
   the keyword detected in the call content,
   the call connect time,
   the call start date,
   the call start time,
   the call end date,
   the call end time,
   the call duration,
   the identifier for the extension or direct connect line carrying the call,
   the PBX trunk through which the call is processed,
   the channel through which the call is processed,
   the digits dialed prior to the base phone number, and
   the digits dialed after the base phone number;

means for determining said at least one attribute of the incoming and outgoing call between the public circuit-switched network and the one or more end-user stations located within the enterprise's one or more locations; and means for performing said at least one action in accordance with said one or more rules associated with the one or more end-user stations located within the enterprise's one or more locations.

2. The telephony security system as defined in claim 1 wherein said call type attribute is from a group including:
voice,
fax,
data transfer (modem),
STU-III-voice,
STU-III-data,
STU-III-unspecified,
wideband,
wideband video,
busy,
unanswered, and
undetermined.

3. The telephony security system as defined in claim 1 wherein said at least one action is from a group including:
allowing the call,
denying the call,
redirecting the call,
recording the call content,
encrypting the call,
sending a tone,
sending a message,
logging the call,
generating a report, and
providing an alert,
adjusting the security policy, and
performing one or more designated assessments,
said one or more designated assessments including either or both of:
authenticating an inbound call for remote access, and
monitoring the call content for keywords.

4. The telephony security system as defined in claim 3 wherein one or more of said at least one action is performed using a remote management server and/or other peripheral device,
said remote management server and/or other peripheral device performing said one or more of said at least one action from a group including:
logging the call,
recording the call content,
monitoring the call content for keywords,
generating a report,
providing an alert, and
adjusting the security policy.

5. The telephony security system as defined in claim 3 wherein one or more of said at least one action may be preempted and/or complemented by a system administrator manually selecting one or more preemptive/complementary actions from a group including:
allowing the call,
denying the call,
redirecting the call,
logging the call,
recording the call content,
encrypting the call,
generating a report,
providing an alert,
adjusting the security policy, and
performing one or more assessments.

6. The telephony security system as defined in claim 3 wherein said action of generating a report includes generating at least one report from a group including:
a post-event report,
a schedule-generated report,
an ad hoc report,
a batch analysis report,
a trend report, and
a difference/comparison report.

7. The telephony security system as defined in claim 3 wherein said action of generating an alert notification includes generating at least one alert notification from a group including:
an electronic mail notification,
a pager alerting notification,
a console messaging notification, and
a Simple Network Management Protocol (SNMP) trap.

8. A telephony security system located within a public circuit-switched network for monitoring and/or controlling incoming and outgoing calls between a public circuit-switched network for provision of circuit-switched circuits to the public, wherein a physical circuit is temporarily established on demand and kept reserved for the user until the network receives a disconnect signal, and one or more end-user stations located within an enterprise's one or more locations, said telephony security system comprising:
one or more rules associated with the one or more end-user stations located within the enterprise's one or more locations,
said one or more rules associated with the one or more end-user stations located within the enterprise's one or more locations designating at least one action to be performed based on at least one attribute of an incoming and outgoing call between the public circuit-switched network and the one or more end-user stations located within the enterprise's one or more locations,
said at least one attribute of the incoming and outgoing call between the public circuit-switched network and the one or more end-user stations located within the enterprise's one or more locations is from a group including:
the call direction,
the call source,
the call destination,
the call type,
the keyword detected in the call content,
the call connect time,
the call start date,
the call start time,
the call end date,
the call end time,
the call duration,
the identifier for the extension or direct connect line carrying the call,
the PBX trunk through which the call is processed,
the channel through which the call is processed,
the digits dialed prior to the base phone number, and
the digits dialed after the base phone number;
means for determining said at least one attribute of the incoming and outgoing call between the public circuit-switched network and the one or more end-user stations located within the enterprise's one or more locations; and
means for performing said at least one action in accordance with said one or more rules associated with the one or more end-user stations located within the enterprise's one or more locations.

9. The telephony security system as defined in claim 8 wherein said call type attribute is from a group including:
voice,
fax,
data transfer (modem),
STU-III-voice, STU-III-data,
STU-III-unspecified,
wideband,
wideband video,
busy,
unanswered, and
undetermined.

10. The telephony security system as defined in claim 8 wherein said at least one action is from a group including:
  allowing the call,
  denying the call,
  redirecting the call,
  recording the call content,
  encrypting the call,
  sending a tone,
  sending a message,
  logging the call,
  generating a report, and
  providing an alert,
  adjusting the security policy, and
  performing one or more designated assessments,
  said one or more assessments include either or both of:
  authenticating an inbound call for remote access, and
  monitoring the call content for keywords.

11. The telephony security system as defined in claim 10 wherein one or more of said at least one action is performed using a remote management server and/or other peripheral device,
  said remote management server and/or other peripheral device performing said one or more of said at least one action from a group including:
  logging the call,
  recording the call content,
  monitoring the call content for keywords,
  generating a report,
  providing an alert, and
  adjusting the security policy.

12. The telephony security system as defined in claim 10 wherein one or more of said at least one action may be preempted and/or complemented by a system administrator manually selecting one or more preemptive/complementary actions from a group including:
  allowing the call,
  denying the call,
  redirecting the call,
  logging the call,
  recording the call content,
  encrypting the call,
  generating a report,
  providing an alert,
  adjusting the security policy, and
  performing one or more assessments.

13. The telephony security system as defined in claim 10 wherein said action of generating a report includes generating at least one report from a group including:
  a post-event report,
  a schedule-generated report,
  an ad hoc report,
  a batch analysis report,
  a trend report, and
  a difference/comparison report.

14. The telephony security system as defined in claim 10 wherein said action of generating an alert notification includes generating at least one alert notification from a group including:
  an electronic mail notification,
  a pager alerting notification,
  a console messaging notification, and
  a Simple Network Management Protocol (SNMP) trap.

15. A method for monitoring and/or controlling incoming and outgoing calls between a public circuit-switched network for provision of circuit-switched circuits to the public, wherein a physical circuit is temporarily established on demand and kept reserved for the user until the network receives a disconnect signal, and one or more end-user stations located within an enterprise's one or more locations, said method comprising the following steps to be performed within the public circuit-switched network:
  establishing one or more rules associated with the one or more end-user stations located within the enterprise's one or more locations,
  said one or more rules associated with the one or more end-user stations located within the enterprise's one or more locations designating at least one action to be performed based on at least one attribute of an incoming and outgoing call between the public circuit-switched network and the one or more end-user stations located within the enterprise's one or more locations,
  said at least one attribute of the incoming and outgoing call between the public circuit-switched network and the one or more end-user stations located within the enterprise's one or more locations is from a group including:
  the call direction,
  the call source,
  the call destination,
  the call type,
  the keyword detected in the call content,
  the call connect time,
  the call start date,
  the call start time,
  the call end date,
  the call end time,
  the call duration,
  the identifier for the extension or direct connect line carrying the call,
  the PBX trunk through which the call is processed,
  the channel through which the call is processed,
  the digits dialed prior to the base phone number, and
  the digits dialed after the base phone number;
  determining said at least one attribute of the incoming and outgoing call between the public circuit-switched network and the one or more end-user stations located within the enterprise's one or more locations; and
  performing said at least one action in accordance with said one or more rules associated with the one or more end-user stations located within the enterprise's one or more locations.

16. The telephony security system as defined in claim 15 wherein said call type attribute is from a group including:
  IP voice,
  busy,
  unanswered, and
  undetermined.

17. The telephony security system as defined in claim 15 wherein said at least one action is from a group including:
  allowing the call,
  denying the call,
  redirecting the call,
  recording the call content,
  encrypting the call,
  sending a tone,
  sending a message,
  logging the call, generating a report, and
providing an alert,
adjusting the security policy, and
performing one or more designated assessments,
said one or more assessments include either or both of:
authenticating an inbound call for remote access, and
monitoring the call content for keywords.

18. The telephony security system as defined in claim 17 wherein one or more of said at least one action is performed using a remote management server and/or other peripheral device,
said remote management server and/or other peripheral device performing said one or more of said at least one action from a group including:
logging the call,
recording the call content,
monitoring the call content for keywords,
generating a report,
providing an alert, and
adjusting the security policy.

19. The telephony security system as defined in claim 17 wherein one or more of said at least one action may be preempted and/or complemented by a system administrator manually selecting one or more preemptive/complementary actions from a group including:
allowing the call,
denying the call,
redirecting the call,
logging the call,
recording the call content,
encrypting the call,
generating a report,
providing an alert,
adjusting the security policy, and
performing one or more assessments.

20. The telephony security system as defined in claim 17 wherein said action of generating a report includes generating at least one report from a group including:
a post-event report,
a schedule-generated report,
an ad hoc report,
a batch analysis report,
a trend report, and
a difference/comparison report.

21. The telephony security system as defined in claim 17 wherein said action of generating an alert notification includes generating at least one alert notification from a group including:
an electronic mail notification,
a pager alerting notification,
a console messaging notification, and
a Simple Network Management Protocol (SNMP) trap.

22. A telephony security system located within one or more locations of an enterprise for monitoring and/or controlling incoming and outgoing calls between a public packet-switched network for provision of packet-switched circuits to the public, wherein data is carried in the form of packets and one or more end-user stations located within an enterprise's one or more locations, said telephony security system comprising:
one or more rules associated with the one or more end-user stations located within the enterprise's one or more locations,
said one or more rules associated with the one or more end-user stations located within the enterprise's one or more locations designating at least one action to be performed based on at least one attribute of an incoming and outgoing call packet between the public packet-switched network and the one or more end-user stations located within the enterprise's one or more locations,
said at least one attribute of the incoming and outgoing call packet between the public packet-switched network and the one or more end-user stations located within the enterprise's one or more locations is from a group including:
the call direction,
the call source,
the call destination,
the call type,
the keyword detected in the call content,
call connect time,
the call start date,
the call start time,
the call end date,
the call end time,
the call duration,
the codec used,
the number of bytes from the call source,
the number of bytes from the call destination,
the number of packets from the call source,
the number of packets from the call destination,
source transmission rate,
destination transmissions rate,
source latency,
destination latency,
source jitter,
destination jitter,
source packet loss,
destination packet loss, and
total bandwidth used;
means for determining said at least one attribute of the incoming and outgoing call packet between the public packet-switched network and the one or more end-user stations located within the enterprise's one or more locations; and
means for performing said at least one action in accordance with said one or more rules associated with the one or more end-user stations located within the enterprise's one or more locations.

23. A method for monitoring and/or controlling incoming and outgoing calls between a public packet-switched network for provision of packet-switched circuits to the public, wherein data is carried in the form of packets and one or more end-user stations located within an enterprise's one or more locations, said method comprising the following steps to be performed within one or more locations of an enterprise:
establishing one or more rules associated with the one or more end-user stations located within the enterprise's one or more locations,
said one or more rules associated with the one or more end-user stations located within the enterprise's one or more locations designating at least one action to be performed based on at least one attribute of an incoming and outgoing call packet between the public packet-switched network and the one or more end-user stations located within the enterprise's one or more locations,
said at least one attribute of the incoming and outgoing call packet between the public packet-switched network and the one or more end-user stations located within the enterprise's one or more locations is from a group including:
the call direction,
the call source, the call destination,
the call type,
the keyword detected in the call content,
call connect time,
the call start date,
the call start time,
the call end date,
the call end time,
the call duration,
the codec used,
the number of bytes from the call source,
the number of bytes from the call destination,
the number of packets from the call source,
the number of packets from the call destination,
source transmission rate,
destination transmissions rate,
source latency,
destination latency,
source jitter,
destination jitter,
source packet loss,
destination packet loss, and
total bandwidth used;
determining said at least one attribute of the incoming and outgoing call packet between the public packet-switched network and the one or more end-user stations located within the enterprise's one or more locations; and
performing said at least one action in accordance with said one or more rules associated with the one or more end-user stations located within the enterprise's one or more locations.

24. A telephony security system located within a public-switched network for monitoring and/or controlling incoming and outgoing calls between a public packet-switched network for provision of packet-switched circuits to the public, wherein data is carried in the form of packets and one or more end-user stations located within an enterprise's one or more locations, said telephony security system comprising:
one or more rules associated with the one or more end-user stations located within the enterprise's one or more locations,
said one or more rules associated with the one or more end-user stations located within the enterprise's one or more locations designating at least one action to be performed based on at least one attribute of an incoming and outgoing call packet between the public packet-switched network and the one or more end-user stations located within the enterprise's one or more locations,
said at least one attribute of the incoming and outgoing call packet between the public packet-switched network and the one or more end-user stations located within the enterprise's one or more locations is from a group including:
the call direction,
the call source,
the call destination,
the call type,
the keyword detected in the call content,
the call connect time,
the call start date,
the call start time,
the call end date,
the call end time,
the call duration,
the codec used,
the number of bytes from the call source,
the number of bytes from the call destination,
the number of packets from the call source,
the number of packets from the call destination,
source transmission rate,
destination transmission rate,
source latency,
destination latency,
source jitter,
destination jitter,
source packet loss,
destination packet loss, and
total bandwidth used;
means for determining said at least one attribute of the incoming and outgoing call packet between the public packet-switched network and the one or more end-user stations located within the enterprise's one or more locations; and
means for performing said at least one action in accordance with said one or more rules associated with the one or more end-user stations located within the enterprise's one or more locations.

25. The telephony security system as defined in claim 24 wherein said call type attribute is from a group including:
IP voice,
busy,
unanswered, and
undetermined.

26. The telephony system as defined in claim 24 wherein said at least one action is from a group including:
allowing the call,
denying the call,
redirecting the call,
recording the call content,
encrypting the call,
sending a tone,
sending a message,
logging the call,
generating a report, and
providing an alert,
adjusting the security policy, and
performing one or more designated assessments,
said one or more designated assessments including either or both of:
authenticating an inbound call for remote access, and
monitoring the call content for keywords.

27. The telephony security system as defined in claim 26 wherein one or more of said at least one action is performed using a remote management server and/or other peripheral device,
said remote management server and/or other peripheral device performing said one or more of said at least one action from a group including:
logging the call,
recording the call content,
monitoring the call content for keywords,
generating a report,
providing an alert, and
adjusting the security policy.

28. The telephony security system as defined in claim 26 wherein one or more of said at least one action may be preempted and/or complemented by a system administrator manually selecting one or more preemptive/complementary actions from a group including:
allowing the call,
denying the call, redirecting the call,
logging the call,
recording the call content,
encrypting the call,
generating a report,
providing an alert,
adjusting the security policy, and
performing one or more assessments.

29. The telephony security system as defined in claim 26 wherein said action of generating a report includes generating at least one report from a group including:
a post-event report,
a schedule-generated report,
an ad hoc report,
a batch analysis report,
a trend report, and
a difference/comparison report.

30. The telephony security system as defined in claim 26 wherein said action of generating an alert notification includes generating at least one alert notification from a group including:
an electronic mail notification,
a pager alerting notification,
a console messaging notification, and
a Simple Network Management Protocol (SNMP) trap.

31. A telephony security system located within one or more locations of an enterprise for monitoring and/or controlling incoming and outgoing calls between a public circuit-switched network for provision of circuit-switched circuits to the public, wherein a physical circuit is temporarily established on demand and kept reserved for the user until the network receives a disconnect signal and/or a public packet-switched network for provision of packet-switched circuits to the public, wherein data is carried in the form of packets and one or more end-user stations located within an enterprise's one or more locations, said telephony security system comprising:
one or more rules associated with the one or more end-user stations located within the enterprise's one or more locations,
said one or more rules associated with the one or more end-user stations located within the enterprise's one or more locations designating at least one action to be performed based on at least one attribute of an incoming and outgoing call and/or call packet between the public circuit-switched network and/or the public packet-switched network and the one or more end-user stations located within the enterprise's one or more locations,
said at least one attribute of the incoming and outgoing call and/or call packet between the public circuit-switched network and/or the public packet-switched network and the one or more end-user stations located within the enterprise's one or more locations is from a group including:
the call direction,
the call source,
the call destination,
the call type,
the keyword detected in the call content,
the call connect time,
the call start date,
the call start time,
the call end date,
the call end time,
the call duration,
the identifier for the extension or direct connect line carrying the call,
the PBX trunk through which the call is processed,
the channel through which the call is processed,
the digits dialed prior to the base phone number,
the digits dialed after the base phone number,
the codec used,
the number of bytes from the call source,
the number of bytes from the call destination,
the number of packets from the call source,
the number of packets from the call destination,
source transmission rate,
destination transmission rate,
source latency,
destination latency,
source jitter,
destination jitter,
source packet loss,
destination packet loss, and
total bandwidth used;
means for determining said at least one attribute of the incoming and outgoing call and/or call packet between the public circuit-switched network and/or the public packet-switched network and the one or more end-user stations located within the enterprise's one or more locations; and
means for performing said at least one action in accordance with said one or more rules associated with the one or more end-user stations located within the enterprise's one or more locations.

32. The telephony security system as defined in claim 31 wherein said call type attribute is from a group including:
voice,
fax,
data transfer (modem),
STU-III-voice,
STU-III-data,
STU-III-unspecified,
wideband,
wideband video
IP voice,
busy,
unanswered, and
undetermined.

33. The telephony security system as defined in claim 31 wherein said at least one action is from a group including:
allowing the call,
denying the call,
redirecting the call,
recording the call content,
encrypting the call,
sending a tone,
sending a message,
logging the call,
generating a report, and
providing an alert,
adjusting the security policy, and
performing one or more designated assessments,
said one or more designated assessments including either or both of:
authenticating an inbound call for remote access, or
monitoring the call content for keywords.

34. The telephony security system as defined in claim 33 wherein one or more of said at least one action is performed using a remote management server and/or other peripheral device, said remote management server and/or other peripheral device performing said one or more of said at least one action from a group including:
logging the call,
recording the call content,
monitoring the call content for keywords,
generating a report,
providing an alert, and
adjusting the security policy.

35. The telephony security system as defined in claim 33 wherein one or more of said at least one action may be preempted and/or complemented by a system administrator manually selecting one or more preemptive/complementary actions from a group including:
allowing the call,
denying the call,
redirecting the call,
logging the call,
recording the call content,
encrypting the call,
generating a report,
providing an alert,
adjusting the security policy, and
performing one or more assessments.

36. The telephony security system as defined in claim 33 wherein said action of generating a report includes generating at least one report from a group including:
a post-event report,
a schedule-generated report,
an ad hoc report,
a batch analysis report,
a trend report, and
a difference/comparison report.

37. The system as defined in claim 33 wherein said action of generating an alert notification includes generating at least one alert notification from a group including:
an electronic mail notification,
a pager alerting notification,
a console messaging notification, and
a Simple Network Management Protocol (SNMP) trap.

38. A method for monitoring and/or controlling incoming and outgoing calls between a public circuit-switched network for provision of circuit-switched circuits to the public, wherein a physical circuit is temporarily established on demand and kept reserved for the user until the network receives a disconnect signal and/or a public packet-switched network for provision of packet-switched circuits to the public, wherein data is carried in the form of packets and one or more end-user stations located within an enterprise's one or more locations, said method comprising the following steps to be performed within one or more locations of an enterprise:
establishing one or more rules associated with the one or more end-user stations located within the enterprise's one or more locations,
said one or more rules associated with the one or more end-user stations located within the enterprise's one or more locations designating at least one action to be performed based on at least one attribute of an incoming and outgoing call and/or call packet between the public circuit-switched network and/or the public packet-switched network and the one or more end-user stations located within the enterprise's one or more locations,
said at least one attribute of the incoming and outgoing call and/or call packet between the public circuit-switched network and/or the public packet-switched network and the one or more end-user stations located within the enterprise's one or more locations is from a group including:
the call direction,
the call source,
the call destination,
the call type,
the keyword detected in the call content,
the call connect time,
the call start date,
the call start time,
the call end date,
the call end time,
the call duration,
the identifier for the extension or direct connect line carrying the call,
the PBX trunk through which the call is processed,
the channel through which the call is processed,
the digits dialed prior to the base phone number,
the digits dialed after the base phone number,
the codec used,
the number of bytes from the call source,
the number of bytes from the call destination,
the number of packets from the call source,
the number of packets from the call destination,
source transmission rate,
destination transmission rate,
source latency,
destination latency,
source jitter,
destination jitter,
source packet loss,
destination packet loss, and
total bandwidth used;
determining said at least one attribute of the incoming and outgoing call and/or call packet between the public circuit-switched network and/or the public packet-switched network and the one or more end-user stations located within the enterprise's one or more locations; and
performing said at least one action in accordance with said one or more rules associated with the one or more end-user stations located within the enterprise's one or more locations.

39. The telephony security system as defined in claim 38 wherein said action of generating an alert notification includes generating at least one alert notification from a group including:
an electronic mail notification,
a pager alerting notification,
a console messaging notification, and
a Simple Network Management Protocol (SNMP) trap.

40. A telephony security system located within either a public circuit-switched network and/or a public packet-switched network for monitoring and/or controlling incoming and outgoing calls between the public circuit-switched network and/or the public packet-switched network and one or more end-user stations located within an enterprise's one or more locations, said telephony security system comprising:
one or more rules associated with the one or more end-user stations located within the enterprise's one or more locations,
said one or more rules associated with the one or more end-user stations located within the enterprise's one or more locations designating at least one action to be performed based on at least one attribute of an incoming and outgoing call and/or call packet between the public circuit-switched network and/or the public packet-switched network and the one or more end-user stations located within the enterprise's one or more locations, said at least one attribute of the incoming and outgoing call and/or call packet between the public circuit-switched network and/or the public packet-switched network and the one or more end-user stations located within the enterprise's one or more locations is from a group including:
the call direction,
the call source,
the call destination,
the call type,
the keyword detected in the call content,
the call connect time,
the call start date,
the call start time,
the call end date,
the call end time,
the call duration,
the identifier for the extension or direct connect line carrying the call,
the PBX trunk through which the call is processed,
the channel through which the call is processed,
the digits dialed prior to the base phone number,
the digits dialed after the base phone number,
the codec used,
the number of bytes from the call source,
the number of bytes from the call destination,
the number of packets from the call source,
the number of packets from the call destination,
source transmission rate,
destination transmission rate,
source latency,
destination latency,
source jitter,
destination jitter,
source packet loss,
destination packet loss, and
total bandwidth used;

means for determining said at least one attribute of the incoming and outgoing call and/or call packet between the public circuit-switched network and/or the public packet-switched network and the one or more end-user stations located within the enterprise's one or more locations; and means for performing said at least one action in accordance with said one or more rules associated with the one or more end-user stations located within the enterprise's one or more locations.

41. The telephony security system as defined in claim 40 wherein said call type attribute is from a group including:
voice,
fax,
data transfer (modem),
STU-III-voice,
STU-III-data,
STU-III-unspecified,
wideband,
wideband video
IP voice,
busy,
unanswered, and
undetermined.

42. The telephony system as defined in claim 40 wherein said at least one action is from a group including:
allowing the call,
denying the call,
redirecting the call,
recording the call content,
encrypting the call,
sending a tone,
sending a message,
logging the call,
generating a report, and
providing an alert,
adjusting the security policy, and
performing one or more designated assessments,
whereby options for said one or more assessments include either or both of:
authenticating an inbound call for remote access, and
monitoring the call content for keywords.

43. The telephony security system as defined in claim 42 wherein one or more of said at least one action is performed using a remote management server and/or other peripheral device,
said remote management server and/or other peripheral device performing said one or more of said at least one action from a group including:
logging the call,
recording the call content,
monitoring the call content for keywords,
generating a report,
providing an alert, and
adjusting the security policy.

44. The telephony security system as defined in claim 42 wherein one or more of said at least one action may be preempted and/or complemented by a system administrator manually selecting one or more preemptive/complementary actions from a group including:
allowing the call,
denying the call,
redirecting the call,
logging the call,
recording the call content,
encrypting the call,
generating a report,
providing an alert,
adjusting the security policy, and
performing one or more assessments.

45. The telephony security system as defined in claim 42 wherein said action of generating a report includes generating at least one report from a group including:
a post-event report,
a schedule-generated report,
an ad hoc report,
a batch analysis report,
a trend report, and
a difference/comparison report.

46. A telephony security system located within one or more locations of an enterprise for centralized monitoring and/or control of incoming and outgoing calls between a first disparate circuit-switched communications network and a second disparate packet-switched communications network and one or more end-user stations located within an enterprise's one or more locations, said telephony security system comprising:
one or more rules associated with the one or more end-user stations located within the enterprise's one or more locations, said one or more rules associated with the one or more end-user stations located within the enterprise's one or more locations designating at least one action to be performed based on at least one attribute of an incoming and outgoing call between the first of the one or more disparate communications networks and/or the second of the one or more disparate communications networks and the one or more end-user stations located within the enterprise's one or more locations, said at least one attribute of the incoming and outgoing call between the first of the one or more disparate communications networks and/or the second of the one or more disparate communications networks and the one or more end-user stations located within the enterprise's one or more locations is from a group including:
  the call direction,
  the call source,
  the call destination,
  the call type,
  the keyword detected in the call content,
  the call connect time,
  the call start date,
  the call start time,
  the call end date,
  the call end time,
  the call duration,
  the identifier for the extension or direct connect line carrying the call,
  the PBX trunk through which the call is processed,
  the channel through which the call is processed,
  the digits dialed prior to the base phone number,
  the digits dialed after the base phone number,
  the codec used,
  the number of bytes from the call source,
  the number of bytes from the call destination,
  the number of packets from the call source,
  the number of packets from the call destination,
  source transmission rate,
  destination transmission rate,
  source latency,
  destination latency,
  source jitter,
  destination jitter,
  source packet loss,
  destination packet loss, and
  total bandwidth used;

means for determining said at least one attribute of the incoming and outgoing call between the first of the one or more disparate communications networks and/or the second of the one or more disparate communications networks and the one or more end-user stations located within the enterprise's one or more locations; and means for performing said at least one action in accordance with said one or more rules associated with the one or more end-user stations located within the enterprise's one or more locations.

47. The telephony security system as defined in claim 46 wherein said call type attribute is from a group including:
  voice,
  fax,
  data transfer (modem),
  STU-III-voice,
  STU-III-data,
  STU-III-unspecified,
  wideband,
  wideband video
  IP voice,
  busy,
  unanswered, and
  undetermined.

48. The telephony security system as defined in claim 46 wherein said at least one action is from a group including:
  allowing the call,
  denying the call,
  redirecting the call,
  recording the call content,
  encrypting the call,
  sending a tone,
  sending a message,
  logging the call,
  generating a report, and
  providing an alert,
  adjusting the security policy, and
  performing one or more designated assessments,
  said one or more designated assessments including either or both of:
    authenticating an inbound call for remote access, and
    monitoring the call content for keywords.

49. The telephony security system as defined in claim 48 wherein one or more of said at least one action is performed using a remote management server and/or other peripheral device,
  said remote management server and/or other peripheral device performing said one or more of said at least one action from a group including:
    logging the call,
    recording the call content,
    monitoring the call content for keywords,
    generating a report,
    providing an alert, and
    adjusting the security policy.

50. The telephony security system as defined in claim 48 wherein one or more of said at least one action may be preempted and/or complemented by a system administrator manually selecting one or more preemptive/complementary actions from a group including:
  allowing the call,
  denying the call,
  redirecting the call,
  logging the call,
  recording the call content,
  encrypting the call,
  generating a report,
  providing an alert,
  adjusting the security policy, and
  performing one or more assessments.

51. The telephony security system as defined in claim 48 wherein said action of generating a report includes generating at least one report from a group including:
  a post-event report,
  a schedule-generated report,
  an ad hoc report,
  a batch analysis report,
  a trend report, and
  a difference/comparison report.

52. The telephony security system as defined in claim 48 wherein said action of generating an alert notification includes generating at least one alert notification from a group including:
  an electronic mail notification,
  a pager alerting notification,
  a console messaging notification, and
  a Simple Network Management Protocol (SNMP) trap.

* * * * *

UNITED STATES PATENT AND TRADEMARK OFFICE
CERTIFICATE OF CORRECTION

| | |
|---|---|
| PATENT NO. | : 7,133,511 B2 |
| APPLICATION NO. | : 10/779452 |
| DATED | : November 7, 2006 |
| INVENTOR(S) | : David L. Buntin et al. |

It is certified that error appears in the above-identified patent and that said Letters Patent is hereby corrected as shown below:

FIGURE 2:

| | |
|---|---|
| Replace | "236 ELECTRONIC MAIL ALERT" |
| With | --224 ELECTRONIC MAIL ALERT-- |

FIGURE 2:

| | |
|---|---|
| Replace | "238 PAGER ALERT" |
| With | --226 PAGER ALERT-- |

FIGURE 2:

| | |
|---|---|
| Replace | "236 LISTENING STATION" |
| With | --230 LISTENING STATION-- |

FIGURE 2:

| | |
|---|---|
| Replace | "234" (numeral at bracket including a group of peripheral devices: listening station, NIDS module, and recorder) |
| With | --228-- |

Col. 1, line 55:

| | |
|---|---|
| Replace | "firewalls" |
| With | --firewall-- |

Col. 8, line 2:

| | |
|---|---|
| Replace | "line sensor 20K" |
| With | --line sensor 20J-- |

Col. 8, line 23:

| | |
|---|---|
| Replace | "line sensor 20M" |
| With | --line sensor 20L-- |

UNITED STATES PATENT AND TRADEMARK OFFICE
CERTIFICATE OF CORRECTION

| | |
|---|---|
| PATENT NO. | : 7,133,511 B2 |
| APPLICATION NO. | : 10/779452 |
| DATED | : November 7, 2006 |
| INVENTOR(S) | : David L. Buntin et al. |

It is certified that error appears in the above-identified patent and that said Letters Patent is hereby corrected as shown below:

Col. 8, line 24:

Replace "line sensor 20M"
With --line sensor 20L--

Col. 13, line 10:

Replace "switched network 14"
With --switched network 12--

Col. 13, line 11:

Replace "network 16,"
With --network 14,--

Col. 15, line 42:

Replace "As shown in FIG. 2,"
With --As shown in FIG. 3,--

Col. 16, line 35:

Replace "In FIG. 2,"
With --In FIG. 3,--

Col. 16, line 39:

Replace "(2) adjust"
With --adjust--

Col. 16, line 42:

Replace "(3) adjust the security policy"
With --(2) adjust the security policy--

Col. 16, line 45:

Replace "(4) adjust the security policy"

UNITED STATES PATENT AND TRADEMARK OFFICE
CERTIFICATE OF CORRECTION

| | | |
|---|---|---|
| PATENT NO. | : 7,133,511 B2 | Page 3 of 3 |
| APPLICATION NO. | : 10/779452 | |
| DATED | : November 7, 2006 | |
| INVENTOR(S) | : David L. Buntin et al. | |

It is certified that error appears in the above-identified patent and that said Letters Patent is hereby corrected as shown below:

With          --(3) adjust the security policy--

Col. 16, line 48:

Replace      "(5) adjust the security policy"
With          --(4) adjust the security policy--

Col. 16, line 50:

Replace      "content is found to contain designated keywords; (6) allow"
With          --content is found to contain designated keywords; (5) generate email notification if jitter exceeds designated threshold; (6) allow--

Col. 26, Claim 16, line 1:

Replace      "The telephony security system as defined in claim 15"
With          --The telephony security system as defined in claim 22--

Col. 26, Claim 17, line 1:

Replace      "The telephony security system as defined in claim 15"
With          --The telephony security system as defined in claim 22--

Col. 34, Claim 39, line 1:

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,133,511 B2 |
| APPLICATION NO. | : 10/779452 |
| DATED | : November 7, 2006 |
| INVENTOR(S) | : David L. Buntin et al. |

It is certified that error appears in the above-identified patent and that said Letters Patent is hereby corrected as shown below:

FIGURE 2:

| | |
|---|---|
| Replace | "236 ELECTRONIC MAIL ALERT" |
| With | --224 ELECTRONIC MAIL ALERT-- |

FIGURE 2:

| | |
|---|---|
| Replace | "238 PAGER ALERT" |
| With | --226 PAGER ALERT-- |

FIGURE 2:

| | |
|---|---|
| Replace | "236 LISTENING STATION" |
| With | --230 LISTENING STATION-- |

FIGURE 2:

| | |
|---|---|
| Replace | "234" (numeral at bracket including a group of peripheral devices: listening station, NIDS module, and recorder) |
| With | --228-- |

Col. 1, line 55:

| | |
|---|---|
| Replace | "firewalls" |
| With | --firewall-- |

Col. 8, line 2:

| | |
|---|---|
| Replace | "line sensor 20K" |
| With | --line sensor 20J-- |

Col. 8, line 23:

| | |
|---|---|
| Replace | "line sensor 20M" |
| With | --line sensor 20L-- |

Col. 8, line 24:

| | |
|---|---|
| Replace | "line sensor 20M" |
| With | --line sensor 20L-- |

UNITED STATES PATENT AND TRADEMARK OFFICE
CERTIFICATE OF CORRECTION

| | | |
|---|---|---|
| PATENT NO. | : 7,133,511 B2 | |
| APPLICATION NO. | : 10/779452 | |
| DATED | : November 7, 2006 | |
| INVENTOR(S) | : David L. Buntin et al. | |

It is certified that error appears in the above-identified patent and that said Letters Patent is hereby corrected as shown below:

Col. 13, line 10:

| Replace | "switched network 14" |
|---|---|
| With | --switched network 12-- |

Col. 13, line 11:

| Replace | "network 16," |
|---|---|
| With | --network 14,-- |

Col. 15, line 42:

| Replace | "As shown in FIG. 2," |
|---|---|
| With | --As shown in FIG. 3,-- |

Col. 16, line 35:

| Replace | "In FIG. 2," |
|---|---|
| With | --In FIG. 3,-- |

Col. 16, line 39:

| Replace | "(2) adjust" |
|---|---|
| With | --adjust-- |

Col. 16, line 42:

| Replace | "(3) adjust the security policy" |
|---|---|
| With | --(2) adjust the security policy-- |

Col. 16, line 45:

| Replace | "(4) adjust the security policy" |
|---|---|
| With | --(3) adjust the security policy-- |

Col. 16, line 48:

| Replace | "(5) adjust the security policy" |
|---|---|
| With | --(4) adjust the security policy-- |

UNITED STATES PATENT AND TRADEMARK OFFICE
CERTIFICATE OF CORRECTION

| | | |
|---|---|---|
| PATENT NO. | : 7,133,511 B2 | Page 3 of 3 |
| APPLICATION NO. | : 10/779452 | |
| DATED | : November 7, 2006 | |
| INVENTOR(S) | : David L. Buntin et al. | |

It is certified that error appears in the above-identified patent and that said Letters Patent is hereby corrected as shown below:

Col. 16, line 50:

Replace "content is found to contain designated keywords; (6) allow"
With --content is found to contain designated keywords; (5) generate email notification if jitter exceeds designated threshold; (6) allow--

Col. 26, Claim 16, line 52:

Replace "The telephony security system as defined in claim 15"
With --The telephony security system as defined in claim 22--

Col. 26, Claim 17, line 58:

Replace "The telephony security system as defined in claim 15"
With --The telephony security system as defined in claim 22--

Col. 34, Claim 39, line 45:

Replace "The telephony security system as defined in claim 38"
With --The telephony security system as defined in claim 40--

This certificate supersedes the Certificate of Correction issued December 2, 2008.

Signed and Sealed this

Twenty-third Day of December, 2008

JON W. DUDAS
*Director of the United States Patent and Trademark Office*

UNITED STATES PATENT AND TRADEMARK OFFICE
Certificate

Patent No. 7,133,511 B2          Patented: November 7, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David L. Buntin, New Braunfels, TX (US); Keith S. Pickens, San Antonio, TX (US); and Mark D. Collier, San Antonio, TX (US); and Kirk E. Smith, San Antonio, TX (US).

Signed and Sealed this Twelfth Day of February 2013.

AHMAD F. MATAR
*Supervisory Patent Examiner*
Art Unit 2652
Technology Center 2600